(12) United States Patent
Konishi

(10) Patent No.: US 12,183,206 B2
(45) Date of Patent: Dec. 31, 2024

(54) MOTION STATE DETERMINATION APPARATUS OF VEHICLE

(71) Applicant: Mitsubishi Electric Corporation, Tokyo (JP)

(72) Inventor: Kyosuke Konishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 560 days.

(21) Appl. No.: 17/298,067

(22) PCT Filed: Jan. 18, 2019

(86) PCT No.: PCT/JP2019/001490

§ 371 (c)(1),
(2) Date: May 28, 2021

(87) PCT Pub. No.: WO2020/148894

PCT Pub. Date: Jul. 23, 2020

(65) Prior Publication Data

US 2022/0122461 A1 Apr. 21, 2022

(51) Int. Cl.
*G01C 21/28* (2006.01)
*G01C 21/34* (2006.01)
(Continued)

(52) U.S. Cl.
CPC .......... *G08G 1/166* (2013.01); *G01C 21/3461* (2013.01)

(58) Field of Classification Search
CPC ............................ G08G 1/166; G01C 21/3461
See application file for complete search history.

(56) References Cited

U.S. PATENT DOCUMENTS

2017/0032688 A1* 2/2017 Nakayama ................ G06T 7/73
2021/0056713 A1* 2/2021 Rangesh ................ G01S 17/89

FOREIGN PATENT DOCUMENTS

JP 2014-6576 A 1/2014

OTHER PUBLICATIONS

International Search Report for PCT/JP2019/001490 dated Apr. 2, 2019 (PCT/ISA/210).
(Continued)

*Primary Examiner* — Jess Whittington
*Assistant Examiner* — Rami Nabih Bedewi
(74) *Attorney, Agent, or Firm* — Sughrue Mion, PLLC; Richard C. Turner

(57) ABSTRACT

A motion state determination apparatus according to the present disclosure includes a sensor for obtaining observation data on a target object, a route data storage unit, a route component predictor that calculates component parallel and vertical to the route of a motion-dimension prediction value and a prediction error, a first coordinate transformer that transforms a motion-dimension prediction value and a prediction error into those on a coordinate system the same as a first coordinate system, a filter that calculates a motion-dimension estimation value and an estimation error, a second coordinate transformer that transforms a motion-dimension estimation value and an estimation error into a component parallel to the route and a component vertical to the route and a motion-dimension prediction value and a prediction error, and a state determinator that determines a motion state of the target object. As a result, the frequency of an erroneous determination can be decreased.

11 Claims, 9 Drawing Sheets

(51) Int. Cl.
*G01G 1/16* (2006.01)
*G08G 1/16* (2006.01)

(56) References Cited

OTHER PUBLICATIONS

Written Opinion for PCT/JP2019/001490 dated Apr. 2, 2019 (PCT/ISA/237).

* cited by examiner

MOTION STATE DETERMINATION APPARATUS OF VEHICLE

CROSS REFERENCE TO RELATED APPLICATIONS

This application is a National Stage of International Application No. PCT/JP2019/001490 filed Jan. 18, 2019.

TECHNICAL FIELD

The present disclosure relates to a motion state determination apparatus that determines the motion state of a target object.

BACKGROUND ART

To date, there has been known a technology in which motion states of a target object are classified based on observation data. Here, the target object is defined as a movable object such as a vehicle, a vessel, an aircraft, a robot, a human, or a bicycle. For example, Patent Document 1 discloses an apparatus in which from observation data indicating the positions of a vehicle, points at each of which the direction of transverse motion of the vehicle changes are extracted and in which in the case where the distance between the changing points is larger than a specific value, it is determined that the motion state of the vehicle is a meandering.

PRIOR ART REFERENCE

Patent Literature

[Patent Document 1] Japanese Patent Application Laid-Open No. 2014-6576

DISCLOSURE OF THE INVENTION

Problems to be Solved by the Invention

In the case where observation data includes an error, there exists a problem that this observation error causes errors to frequently occur in a motion-state determination. In the conventional technology described in Patent Document 1, in order to make a determination on a meandering from observation data including an observation error, in the case where the distance between transverse-position changing points is smaller than a specific value, i.e., in the case where the transverse position of a vehicle changes small, it is considered that the change in the motion direction is caused by the observation error and hence it is determined that the vehicle is not meandering. However, in general, an observation error becomes larger as the distance between a sensor for performing observation and a target object becomes larger. Accordingly, in a technology such as the technology of Patent Document 1 in which a meandering is determined only based on the position of a target object, a mistake of determining an observation error as a meandering is more liable to occur as the target object is farther from the sensor. Moreover, in the case where in order to decrease such determination mistakes, it is assumed that an observation error is large, a mistake of determining a fine meandering of a target object as an observation error becomes liable to occur as the target object is closer to the sensor.

A motion state determination apparatus according to the present disclosure is to solve the foregoing problems; the objective thereof is to decrease the frequency of mistakes in the determination on the motion state of a target object, even in the case where an observation data includes an observation error, especially, even under an environment where because the distance between the sensor and the target object fluctuates, the observation error is not constant.

Means for Solving the Problems

A motion state determination apparatus according to the present disclosure is characterized by including
 a sensor unit for obtaining observation data on a target object,
 a route data storage unit for storing route data indicating a shape of a route on which the target object can move,
 a route component prediction unit that calculates a component parallel to the route and a component vertical to the route of each of a motion-dimension prediction value for the target object and a prediction error,
 a first coordinate transformation unit that transforms a motion-dimension prediction value and a prediction error, calculated by the route component prediction unit, into those on a coordinate system the same as a first coordinate system for representing the observation data,
 a filtering unit that calculates a motion-dimension estimation value for the target object and an estimation error on the first coordinate system, by use of observation data obtained by the sensor unit, route data stored in the route data storage unit, and a motion-dimension prediction value and a prediction error transformed by the first coordinate transformation unit,
 a second coordinate transformation unit that transforms a motion-dimension estimation value for the target object and an estimation error, calculated by the filtering unit, into those on a second coordinate system whose coordinate axes are a component parallel to the route and a component vertical to the route, and
 a state determination unit that determines a motion state of the target object, by use of a motion-dimension estimation value for the target object and an estimation error, transformed by the second coordinate transformation unit.

Advantage of the Invention

The motion state determination apparatus according to the present disclosure makes it possible to reduce the frequency of an erroneous determination on the motion state of a target object, due to a positional change, of the target object on the observation data, that is caused by an observation error.

BEST MODE FOR CARRYING OUT THE INVENTION

Embodiment 1

Hereinafter, Embodiments of a motion state determination apparatus according to the present disclosure will be explained.

Figure 1:
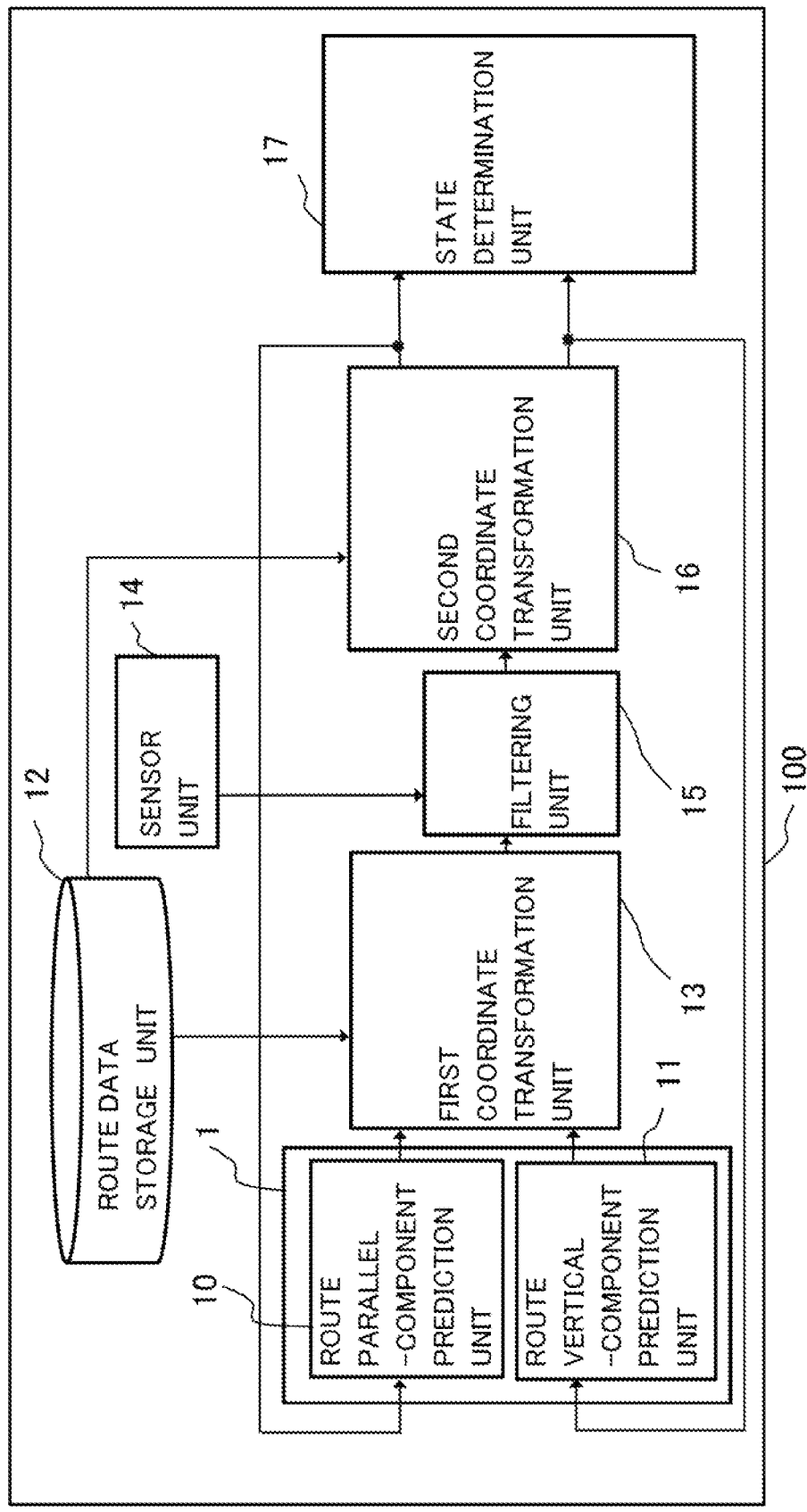
FIG. 1 is a block diagram representing the configuration of a motion state determination apparatus 100 according to Embodiment 1.

FIG. 1 is a block diagram representing the configuration of a motion state determination apparatus 100 according to Embodiment 1. In the present Embodiment, in particular, the kind of a target object is an automobile; the motion states of the target object include two kinds of states, i.e., "a vehicle is meandering" and "a vehicle is not meandering". The automobile whose motion state is subject to a determination is an automobile traveling at a position apart from an automobile (own vehicle) that is equipped with a sensor for performing observation. In addition, the automobile whose motion state is subject to a determination may be the own vehicle. Hereinafter, the target object whose motion state is subject to a determination will be described as a "subject vehicle", and there will be explained the case where the motion states of the subject vehicle include two kinds of states, i.e., "meandering" and "not meandering".

As represented in FIG. 1, the motion state determination apparatus 100 includes a route parallel-component prediction unit 10, a route vertical-component prediction unit 11, a route data storage unit 12, a first coordinate transformation unit 13, a sensor unit 14, a filtering unit 15, a second coordinate transformation unit 16, and a state determination unit 17. Here, the route parallel-component prediction unit 10 and the route vertical-component prediction unit 11 can collectively be dealt with as a route component prediction unit 1. Based on observation data obtained from a sensor and route data stored in the route data storage unit 12, the motion state determination apparatus 100 determines whether or not a subject vehicle 21 is meandering.

Here, the observation data will be defined as information indicating the motion dimensions (the position, the speed, and the time differential amounts thereof) of the subject vehicle 21. Hereinafter, there will be explained the case where the observation data is data indicating the position of the subject vehicle 21. In addition, the route data will be defined as information indicating the shape of a typical traveling route of the subject vehicle 21. Hereinafter, there will be explained the case where the route data is data indicating the shape of a traffic lane on which the subject vehicle 21 is traveling. In particular, in the case where a line passing through the center of a traffic lane is approximated with a set of points, the respective positional data pieces of center points will be referred to as route data, hereinafter. It may be allowed that the target object is a thing other than an automobile, such as a vessel, an aircraft, a robot, a human, or a bicycle. For example, in the case where the target object is a vessel, it may be allowed that the observation data is a communication signal (such as a signal for an automatic vessel identification system) and the route data is a typical sea route. Moreover, for example, in the case where the target object is a human, it may be allowed that the observation data is an image obtained by taking a picture of the human and the route data is the shape of a sidewalk.

Figure 2:
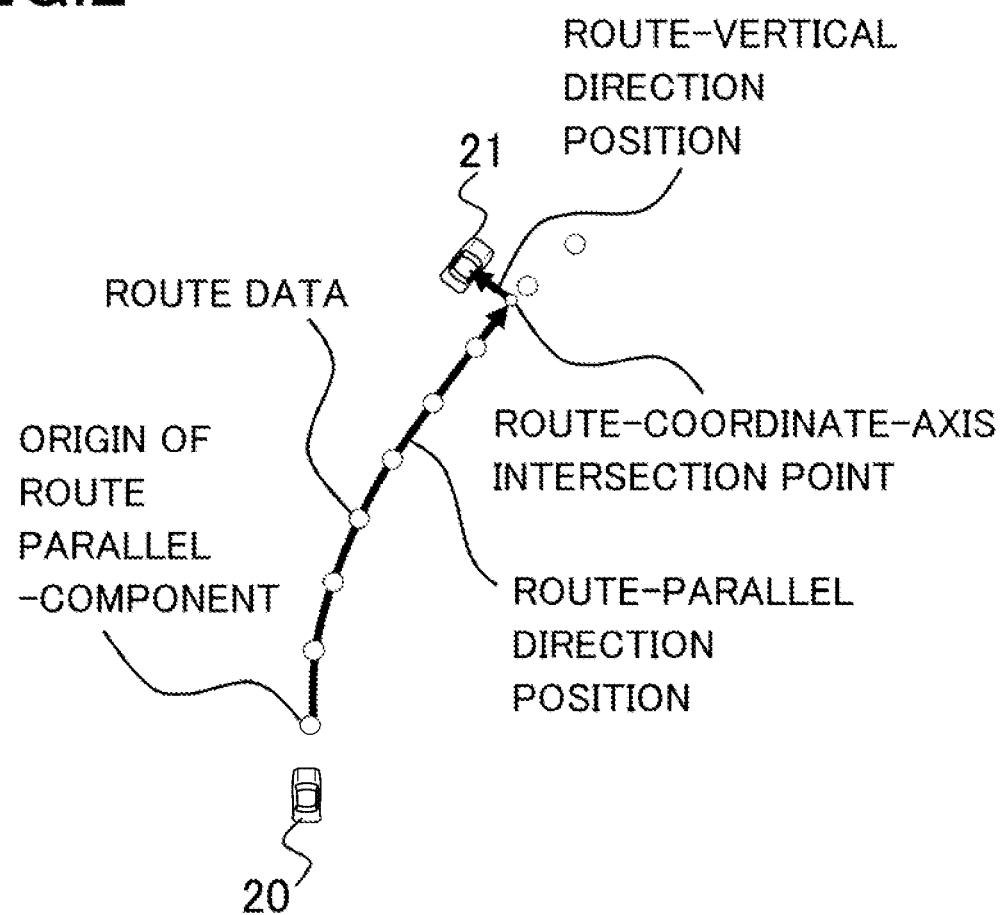
FIG. 2 is a conceptual diagram indicating a route-parallel direction position and a route-vertical direction position related to a subject vehicle 21 in Embodiment 1.

Subsequently, as the terms in the explanation for the motion state determination apparatus 100, a "route-parallel direction" and a "route-vertical direction" will be defined. FIG. 2 is a conceptual diagram representing respective examples of the route-parallel direction and the route-vertical direction in the motion state determination apparatus 100 according to Embodiment 1.

At first, the route-parallel direction axis is defined as a set of lines each of which back and forth connects center points on a traffic lane, which is the route data. Then, the distance from the origin, which is a specific center point on the traffic lane, to a point (route-coordinate-axis intersection point) on the route-parallel direction axis, at which the distance from the subject vehicle 21 is minimum, is defined as the route-parallel direction position related to the subject vehicle 21. Each of the route-parallel direction position and the motion dimension obtained by applying time differentiation to the position is referred to as a "motion-dimension route-parallel direction component".

Subsequently, the route-vertical direction axis is defined as a straight line vertical to the route-parallel direction axis at the route-coordinate-axis intersection point. Then, the distance from the route-coordinate-axis intersection point to a point at which the route-vertical direction axis and the position of the subject vehicle 21 intersect each other is defined as the route-vertical direction position related to the subject vehicle 21. Each of the route-vertical direction position and the motion dimension obtained by applying time differentiation to the position is referred to as a "motion-dimension route-vertical direction component".

Figure 3:
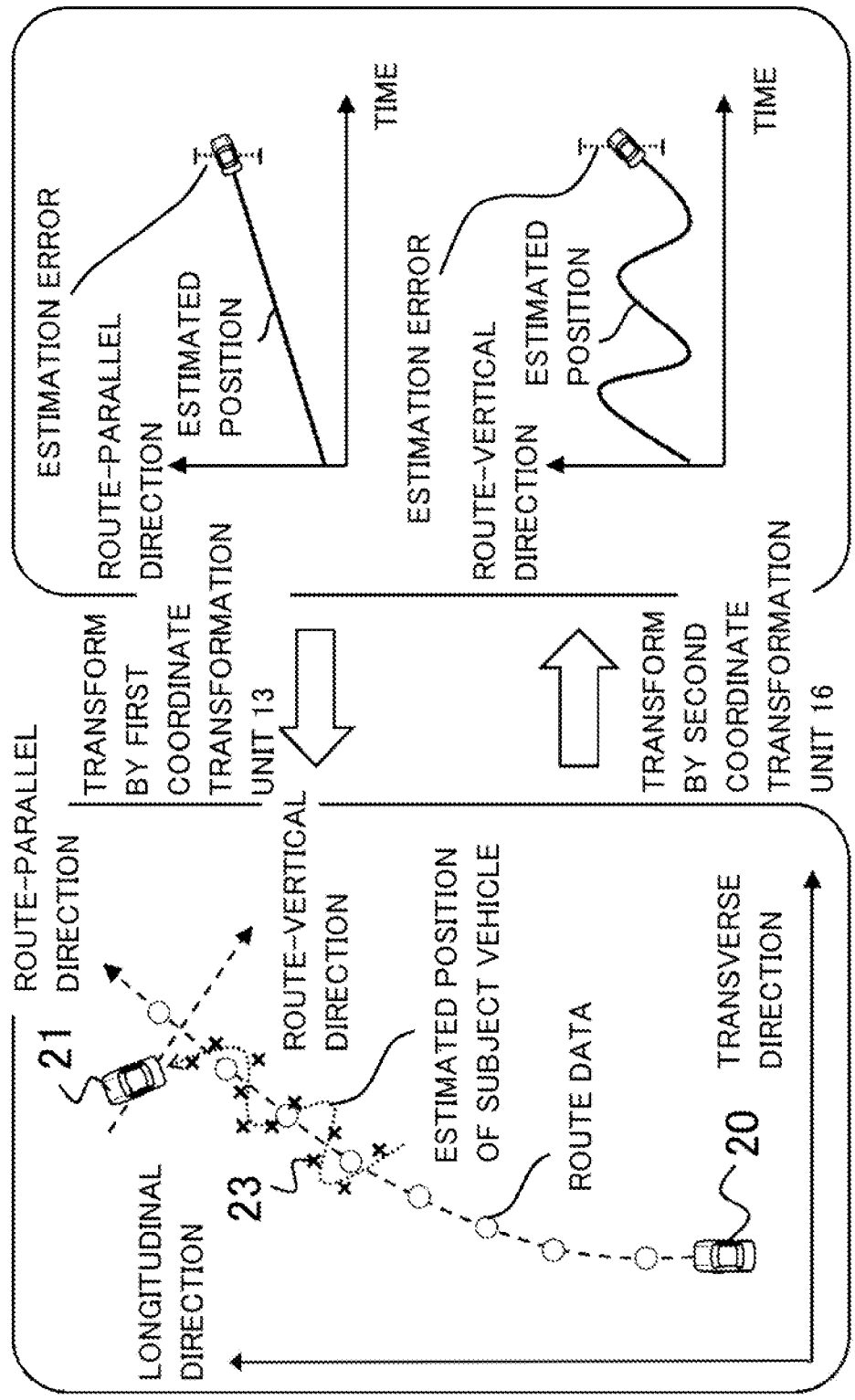
FIG. 3 is conceptual charts representing coordinate transformation between route coordinates and observation coordinates in Embodiment 1.
Figure 7:
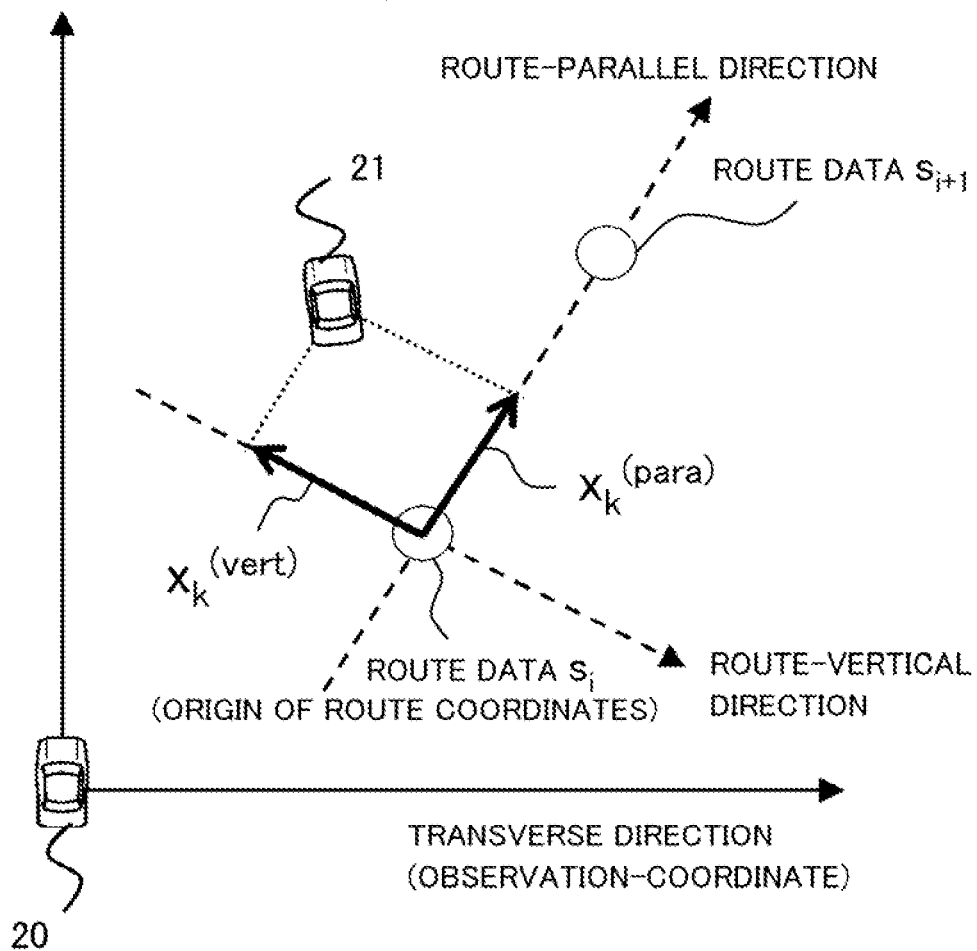
FIG. 7 is a conceptual chart representing an example of a motion dimension vector of the subject vehicle 21 on route coordinates.

Based on the foregoing definitions, the operation of the motion state determination apparatus 100 will be explained by use of FIG. 3. FIG. 3 is a set of conceptual diagrams representing an example of the operation in the motion state determination apparatus 100 according to Embodiment 1. The left drawing in FIG. 7 is a conceptual chart representing the appearance in which in the case where in a coordinate system with a sensor-mounted own vehicle 20, as the reference, the subject vehicle 21 is meandering, observation data 23 caused by the meandering is obtained. In the left drawing in FIG. 3, it is assumed that the position related to the traveling direction of the own vehicle 20 is expressed as a "longitudinal direction" and the position in a direction vertical to the longitudinal direction is expressed as a "transverse direction" and that the observation data 23 is expressed as the respective positions in the longitudinal and transverse directions. Hereinafter, the coordinate system in the observation data 23 will be referred to as "observation coordinates".

In contrast, the right drawing in FIG. 3 is a set of conceptual charts representing the temporal change in an estimated position of the subject vehicle 21, which is meandering in a manner the same as that in the left drawing, in the route-parallel direction and in the route-vertical direction. Hereinafter, the coordinate system in which the motion dimensions are expressed in the route-parallel direction and in the route-vertical direction will be referred to as "route coordinates". As indicated by the respective arrows in the center of FIG. 3, coordinate transformation from the observation coordinates into the route coordinates is performed by the first coordinate transformation unit 13; coordinate transformation from the route coordinates into the observation coordinates is performed by the second coordinate transformation unit 16. After performing, on the route coordinates, prediction of the motion dimensions of the subject vehicle 21 in the next time frame and then transforming the prediction values into the ones on the observation coordinates, the motion state determination apparatus 100 performs, on the observation coordinates, estimation (filtering) of the motion dimensions of the subject vehicle 21, based on the observation data 23. Then, through transformation, the motion state determination apparatus 100 again transforms the estimation values into the ones on the route coordinates and then determines whether or not the subject vehicle 21 is meandering, based on the estimation values on the route coordinates.

Even in the case where for example, as represented in FIG. 3, the subject vehicle 21 is meandering along a bending route, these operation items make it possible to extract, on the route coordinates, meandering in a direction vertical to the route. In particular, the feature of the motion state determination apparatus is that coordinate transformation is applied also to an error (estimation error) in the estimated motion dimension and that it is determined whether or not a meandering exists, by use of the estimation error.

The relationships among functional blocks in FIG. 1 will be described as follows. In addition, hereinafter, the time section in which the sensor outputs observation data will be described as a "time frame". The time frame in which processing is performed will be described as a "present time", and the time frame that is prior to the present time by one time frame will be described as a "previous time".

The route parallel-component prediction unit 10 in the route component prediction unit 1 receives a route parallel-component estimation value of the motion dimension of the subject vehicle 21 and a route parallel-component estimation error at the previous time from the second coordinate transformation unit 16, and then transmits a route parallel-component prediction value of the motion dimension of the subject vehicle 21 and a route parallel-component prediction error at the present time to the first coordinate transformation unit 13.

The route vertical-component prediction unit 11 in the route component prediction unit 1 receives a route vertical-component estimation value of the motion dimension of the subject vehicle 21 and a route vertical-component estimation error at the previous time from the second coordinate transformation unit 16, and then transmits a route vertical-component prediction value of the motion dimension of the subject vehicle 21 and a route vertical-component prediction error at the present time to the first coordinate transformation unit 13.

When each of the first coordinate transformation unit 13 and the second coordinate transformation unit 16 performs transformation, the route data storage unit 12 transmits route data to the first coordinate transformation unit 13 and the second coordinate transformation unit 16. It may be allowed that the route data is preliminarily stored or that each time it is utilized in processing, the route data is obtained through a communication means or the like and then stored. As the communication means for obtaining the route data, an existing technology such as communication with a positioning satellite may be utilized.

The first coordinate transformation unit 13 receives the route parallel-component prediction value of the motion dimension of the subject vehicle 21 and the route parallel-component prediction error at the present time from the route parallel-component prediction unit 10, receives the route vertical-component prediction value of the motion dimension of the subject vehicle 21 and the route vertical-component prediction error at the present time from the route vertical-component prediction unit 11, and receives the route data from the route data storage unit 12. Then, the first coordinate transformation unit 13 transmits an observation-coordinate motion dimension prediction value for the subject vehicle 21 and an observation-coordinate motion dimension prediction error at the present time to the filtering unit 15.

The sensor unit 14 includes apparatuses for observing the position of the subject vehicle 21. For example, the apparatuses are existing ones such as a monocular camera, a stereo camera, a millimeter wave radar, a laser sensor, and a radio signal receiver. The sensor unit 14 transmits observation data on the subject vehicle 21 at the present time to the filtering unit 15. As the means for obtaining observation data (such as the position of the subject vehicle 21) from an image, a distance-measurement value, or the like obtained by an observation apparatus, an existing technology for each observation apparatus, such as algorithm for extracting the distinguishing shape of a vehicle, is utilized.

The filtering unit 15 receives the observation-coordinate motion dimension prediction value and the observation-coordinate motion dimension prediction error at the present time frame from the first coordinate transformation unit 13 and receives the observation data on the subject vehicle 21 at the present time from the sensor unit 14. Then, the filtering unit 15 transmits the observation-coordinate motion dimension estimation value for the subject vehicle 21 and the observation-coordinate motion dimension estimation error at the present time to the second coordinate transformation unit 16.

The second coordinate transformation unit 16 receives the observation-coordinate motion dimension estimation value for the subject vehicle 21 and the observation-coordinate motion dimension estimation error at the present time from the filtering unit 15 and receives the observation data from the route data storage unit 12. Then, the second coordinate transformation unit 16 transmits the route-coordinate motion dimension estimation value for the subject vehicle 21 and the route-coordinate motion dimension estimation error at the present time to the state determination unit 17. Moreover, in the next time frame, the second coordinate transformation unit 16 transmits the route parallel-component estimation value of the motion dimension of the subject vehicle 21 and the route parallel-component estimation error at the previous time to the route parallel-component prediction unit 10 and transmits the route vertical-component estimation value of the motion dimension of the subject vehicle 21 and the route vertical-component estimation error at the previous time to the route vertical-component prediction unit 11.

The state determination unit 17 receives the route-coordinate motion dimension estimation value for the subject vehicle 21 and the route-coordinate motion dimension estimation error at the present time from the second coordinate transformation unit 16 and outputs, as an output of the motion state determination apparatus 100, whether or not a meandering of the subject vehicle 21 exists at the present time.

Figure 4:
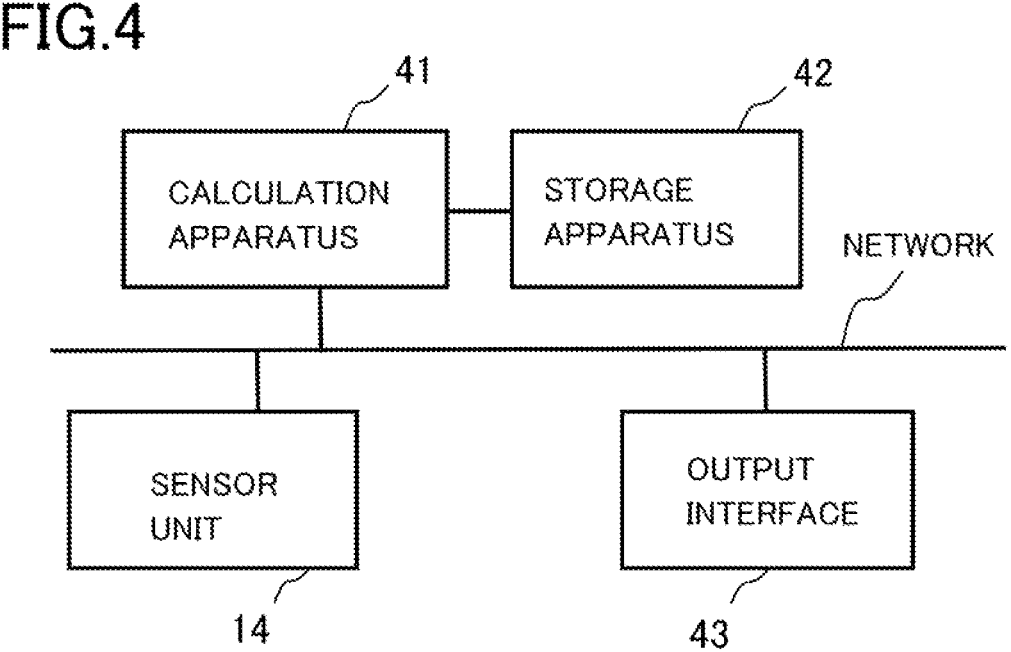
FIG. 4 is a block diagram representing the hardware configuration of the motion state determination apparatus 100 according to Embodiment 1.

FIG. 4 is a diagram representing an example of the hardware configuration according to Embodiment 1. Respective hardware items are connected with one another by a wired circuit such as a bus or through a network. In the motion state determination apparatus 100, the route parallel-component prediction unit 10, the route vertical-component prediction unit 11, the route data storage unit 12, the first coordinate transformation unit 13, the filtering unit 15, the second coordinate transformation unit 16, and the state determination unit 17 are stored in a storage apparatus 42; the respective functions of the route parallel-component prediction unit 10, the route vertical-component prediction unit 11, the first coordinate transformation unit 13, the filtering unit 15, the second coordinate transformation unit 16, and the state determination unit 17 are performed by a calculation apparatus 41.

The route parallel-component prediction unit 10, the route vertical-component prediction unit 11, the first coordinate transformation unit 13, the filtering unit 15, the second coordinate transformation unit 16, and the state determination unit 17 in operation each write input/output values and processing intermediate data in the storage apparatus 42 and each perform reading and deleting thereof from the storage apparatus 42. The calculation apparatus 41 is a CPU (Central Processing Unit), an ECU (Electronic Control Unit), a GPU (Graphics Processing Unit), or the like. The storage apparatus 42 is an HDD (Hard Disk Drive), an SSD (Solid State Drive), a DRAM (Dynamic Random Access Memory), a flash memory, or the like. An output interface 43 is a DVI (Digital Visual Interface, registered trademark), an HDMI (High-Definition Multimedia Interface, registered trademark), a USB (Universal Serial Bus), an Ethernet (registered trademark), a CAN (Controller Area Network) bus, or the like.

Figure 5:
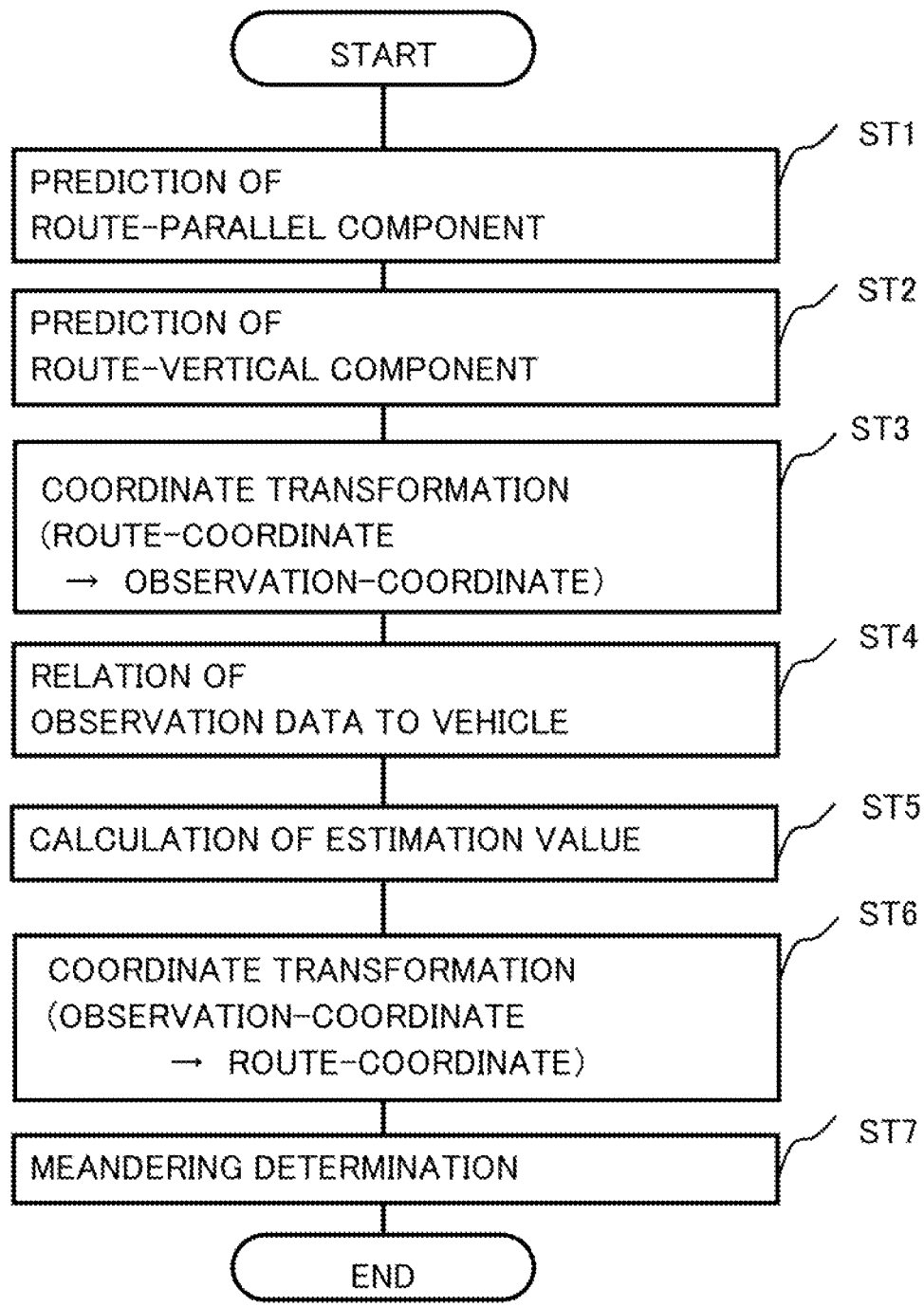
FIG. 5 is a flowchart representing the operation of the motion state determination apparatus 100 according to Embodiment 1.

Next, the details of the operation of the motion state determination apparatus 100 according to Embodiment 1 will be explained by use of a flowchart in FIG. 5. FIG. 5 is a flowchart representing the respective operation items of the route parallel-component prediction unit 10, the route vertical-component prediction unit 11, the first coordinate transformation unit 13, the sensor unit 14, the filtering unit 15, the second coordinate transformation unit 16, and the state determination unit 17 at the present time.

As a preparation for the explanation of the operation items, there will be defined a position vector indicating observation data, a position vector indicating route data, a vector indicating a motion-dimension estimation value for the subject vehicle 21, and a matrix indicating a motion-dimension estimation error. The observation data, here, is data for indicating the position of the subject vehicle 21, as described above. Hereinafter, observation data indicating the position of the subject vehicle 21 in a k-th specific time frame is represented by a 2-row 1-column position vector $z_k$ defined by the equation (1).

$$z_k = [z_k^{(1)} z_k^{(2)}]^T \qquad (1)$$

where, $z_k$ is a position vector on the observation coordinates; $z_k^{(1)}$ is observation data indicating the transverse position of the subject vehicle 21; $z_k^{(2)}$ is observation data indicating the longitudinal position of the subject vehicle 21. The superscript T signifies transposition of a matrix.

The observation data, here, is data for indicating the position of a center point of the traffic lane on which the subject vehicle 21 is traveling, as described above. Hereinafter, the position of the i-th center point of the traffic lane on which the subject vehicle 21 is traveling is represented by a 2-row 1-column position vector $s_i$ defined by the equation (2).

$$s_i = [s_i^{(1)} s_i^{(2)}]^T \qquad (2)$$

where, $s_i$ is a position vector on the observation coordinates; $s_i^{(1)}$ indicates the transverse position of a center point; $s_i^{(2)}$ indicates the longitudinal position of a center point. "i", which is the serial number of each of the center points, is the same as or larger than 1 but the same as or smaller than "I" (I is an integer the same as or larger than 2); route data is represented by I pieces of position vectors $s_i$. The character "i"s, which are the serial numbers of center points, are rearranged in ascending order of the longitudinal position. That is to say, for arbitrary serial numbers, $s_i^{(2)} < s_{i+1}^{(2)}$ is always established.

It is assumed that because in comparison with the distance from the own vehicle 20 to the subject vehicle 21, center points of a traffic lane, which are route data pieces, are obtained in an enough distance, another vehicle is observed in the longitudinal-direction middle between the center points. That is to say, it is assumed that in the case where the serial number of each of the center points is the same as or larger than 1 but the same as or smaller than "I" (I is an integer the same as or larger than 2), the equation below is always established in an arbitrary k-th time frame.

$$s_1^{(2)} < z_k^{(2)} < s_I^{(2)} \qquad (3)$$

Subsequently, the respective vectors each of which indicates the motion-dimension estimation value of the subject vehicle 21 are defined for the observation coordinates and the route coordinates. At first, the motion-dimension estimation value for the subject vehicle 21 on the observation coordinates in the time frame k is represented by a 4-row 1-column vector $x_k^{(obs)}$ below.

$$x_k^{(obs)} = [x_k^{(obs,1)} x_k^{(obs,2)} x_k^{(obs,3)} x_k^{(obs,4)}]^T \qquad (4)$$

where, $x_k^{(obs,1)}$ indicates the transverse-position estimation value of the subject vehicle 21; $x_k^{(obs,2)}$ indicates the longitudinal-position estimation value of the subject vehicle 21; $x_k^{(obs,3)}$ indicates the transverse-speed estimation value of the subject vehicle 21; $x_k^{(obs,4)}$ indicates the longitudinal-speed estimation value of the subject vehicle 21.

Subsequently, the motion-dimension estimation values for the subject vehicle 21 on the route coordinates in the time frame k are represented by a 2-row 1-column vector $x_k^{(para)}$ below indicating the route-parallel component motion dimension estimation value and a 2-row 1-column vector $x_k^{(vert)}$ below indicating the route-vertical component motion dimension estimation value. Each of the vectors $x_k^{(para)}$ and $x_k^{(vert)}$ is defined as follows.

$$x_k^{(para)} = [x_k^{(para,1)} x_k^{(para,2)}]^T \qquad (5)$$

$$x_k^{(vert)} = [x_k^{(vert,1)} x_k^{(vert,2)}]^T \qquad (6)$$

where, $x_k^{(para,1)}$ indicates the estimation value of the route-parallel direction position of the subject vehicle 21; $x_k^{(para,2)}$ indicates the estimation value of the route-parallel direction speed of the subject vehicle 21; $x_k^{(vert,1)}$ indicates the estimation value of the route-vertical direction position of the subject vehicle 21; $x_k^{(vert,2)}$ indicates the estimation value of the route-vertical direction speed of the subject vehicle 21.

Figure 6:
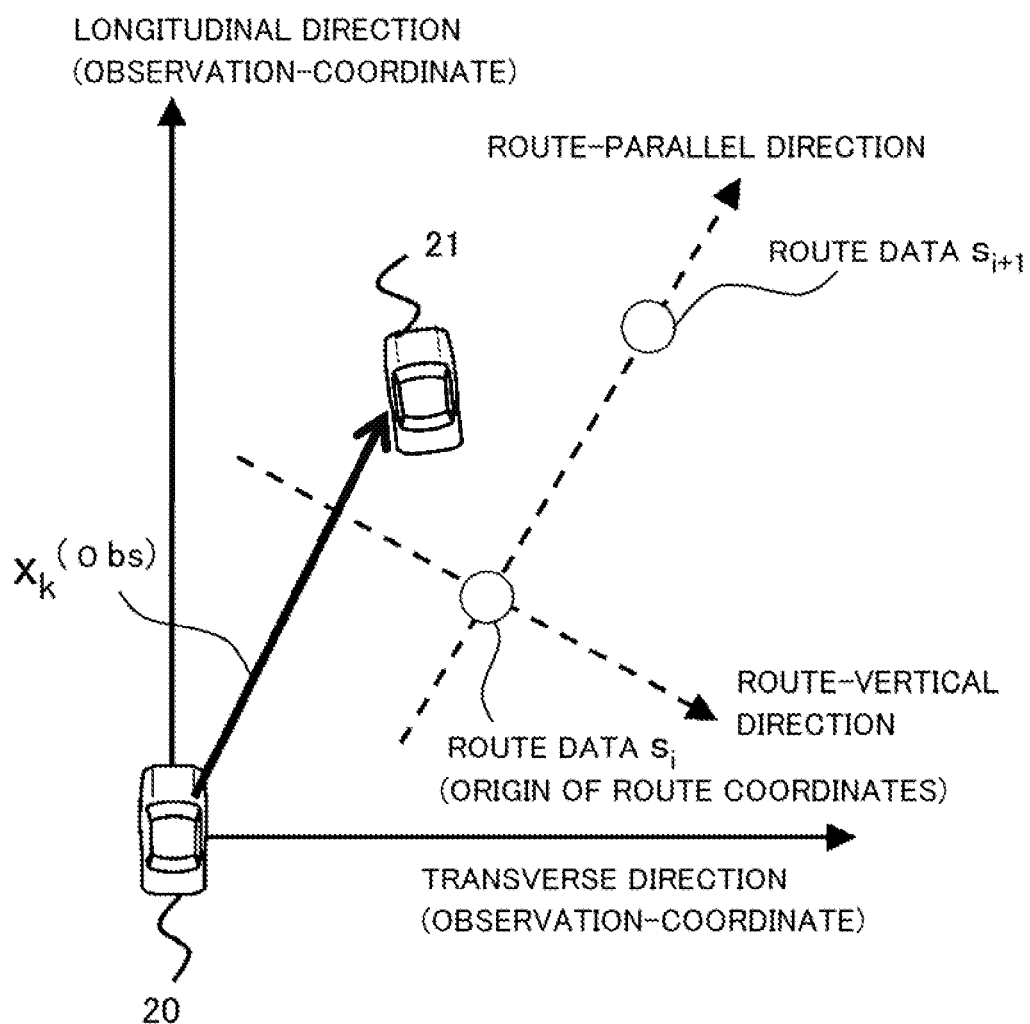
FIG. 6 is a conceptual chart representing an example of a motion dimension vector of the subject vehicle 21 on observation coordinates.

The conceptual charts of the vectors that have been defined as described above and indicate the motion-dimension estimation values are represented in FIGS. 6 and 7. In FIG. 6, the position components of the motion-dimension estimation value $x_k^{(obs)}$ on the observation coordinates are represented; in FIG. 7, the position components of the motion-dimension estimation values $x_k^{(para)}$ and $x_k^{(vert)}$ on the route coordinates are represented. In this regard, however, with regard to the route coordinates in FIG. 7, for the sake of simplicity of the representation, the route data $s_i$ is represented as the origin in the route-parallel direction.

Next, the matrix indicating a motion-dimension estimation error will be defined. The estimation error is represented in the form of an error covariance matrix of motion-dimension vectors. Hereinafter, the error in the motion-dimension estimation value vector $x_k^{(obs)}$ on the observation coordinates is represented as $P_k^{(obs)}$. The errors in the motion-dimension estimation value vectors $x_k^{(para)}$ and $x_k^{(vert)}$ on the route coordinates are represented as $P_k^{(para)}$ and $P_k^{(vert)}$, respectively. Here, as an example, two kinds of motion dimensions, i.e., a positon and a speed have been described. However, it is not necessary required that two kinds of motion dimensions, i.e., a position and a speed are utilized; for example, three or more kinds of motion dimensions, additionally including acceleration, a jerk component, and the like, may be utilized.

Hereinafter, the respective steps in FIG. 5 will be explained. In the step ST1, the route parallel-component prediction unit 10 predicts the route-parallel component motion dimension at the present time and then calculates an error in the motion-dimension prediction value. In this step, by use of the motion-dimension estimation value $x_k^{(para)}$ and the estimation error $P_k^{(para)}$ at the previous time, as the inputs, and based on a motion model in which the route-parallel position of the subject vehicle 21 moves at a constant speed, the motion-dimension prediction value $_{k|k-1}^{(para)}$ and the prediction error $P_{k|k-1}^{(para)}$ are calculated by the equations below.

$$x_{k|k-1}^{(para)} = \Phi_k^{(para)} x_{k-1}^{(para)} \qquad (7)$$

$$P_{k|k-1}^{(para)} = \Phi_k^{(para)} P_{k-1}^{(para)} [\Phi_k^{(para)}]^T + Q_k^{(para)} \qquad (8)$$

where, $Q_k^{(para)}$ is a 2-row 2-column error covariance matrix indicating an error in the motion model and is a parameter to be preliminarily set. $\Phi_k^{(para)}$ is a transition matrix for making a motion dimension vector transit from the previous time to the present time based on the motion model and is represented by the equation below.

$$\Phi_k^{(para)} = \begin{bmatrix} 1 & \tau_k \\ 0 & 1 \end{bmatrix} \qquad (9)$$

where, $\tau_k$ denotes an elapsed time from the previous time to the present time. In the foregoing equation, as the motion model, constant-speed movement is assumed; however, another motion model such as a constant-acceleration motion model with specific acceleration may be adopted.

In the step ST2, the route vertical-component prediction unit 11 predicts the route-vertical component motion dimension at the present time and then calculates an error in the motion-dimension prediction value. In this step, by use of the motion-dimension estimation value $x_k^{(vert)}$ and the estimation error $P_k^{(vert)}$ at the previous time, as the inputs, and based on a motion model in which the route-vertical position of the subject vehicle 21 moves at a constant speed, the motion-dimension prediction value $x_{k|k-1}^{(vert)}$ and the prediction error $P_{k|k-1}^{(vert)}$ are calculated by the equations below.

$$x_{k|k-1}^{(vert)} = \Phi_k^{(vert)} x_{k-1}^{(vert)} \qquad (10)$$

$$Px_{k|k-1}^{(vert)} = \Phi_k^{(vert)} P_{k-1}^{(vert)} [\Phi_k^{(vert)}]^T + Q_k^{(vert)} \qquad (11)$$

where, $Q_k^{(vert)}$ is a 2-row 2-column error covariance matrix indicating an error in the motion model and is a parameter to be preliminarily set. $\Phi_k^{(vert)}$ is a transition matrix for making a motion dimension vector transit from the previous time to the present time based on the motion model and is represented by the equation below.

$$\Phi_k^{(vert)} = \begin{bmatrix} 1 & \tau_k \\ 0 & 1 \end{bmatrix} \qquad (12)$$

In the foregoing equation, as the motion model, constant-speed movement is assumed; however, another motion model such as a constant-acceleration motion model with specific acceleration may be adopted. The motion model and the parameter assumed in the step ST1 may be different from the motion model and the parameter assumed in the step ST2.

In the step ST3, the first coordinate transformation unit 13 transforms the route-coordinate motion dimension prediction value into the observation-coordinate motion dimension prediction value. In addition, the first coordinate transformation unit 13 transforms the route-coordinate motion dimension prediction error into the observation-coordinate motion dimension prediction error. In the transformation, the route data $s_i$ from the route data storage unit 12 is utilized. In this step, by use of $xx_{k|k-1}^{(para)}$, $Px_{k|k-1}^{(para)}$, $x_{k|k-1}^{(vert)}$, $Px_{k|k-1}^{(vert)}$, and $s_i$, as the inputs, the observation-coordinate motion dimension prediction value $xx_{k|k-1}^{(obs)}$ and the observation-coordinate motion dimension prediction error $Px_{k|k-1}^{(obs)}$ are calculated by the equations below.

$$x_{k|k-1}^{(obs)} = G_j^{(para)} xx_{k|k-1}^{(para)} + G_j^{(vert)} xx_{k|k-1}^{(vert)} + g_j \qquad (13)$$

$$Px_{k|k-1}^{(obs)} = G_j^{(para)} Px_{k|k-1}^{(para)} (G_j^{(para)})^T + G_j^{(vert)} P_{k|k-1}^{(vert)} (G_j^{(vert)})^T \qquad (14)$$

where, the rotation matrixes $G_j^{(para)}$ and $G_j^{(vert)}$ and the translation vector $g_j$ are defined as follows.

$$G_j^{(para)} = \begin{bmatrix} e_j^{(para)} & 0_{2 \times 1} \\ 0_{2 \times 1} & e_j^{(para)} \end{bmatrix} \qquad (15)$$

$$G_j^{(vert)} = \begin{bmatrix} e_j^{(vert)} & 0_{2 \times 1} \\ 0_{2 \times 1} & e_j^{(vert)} \end{bmatrix} \qquad (16)$$

$$g_j = \begin{bmatrix} s_j - \lambda_j e_j^{(para)} \\ 0_{2 \times 1} \end{bmatrix} \qquad (17)$$

The unit vector $e_j^{(para)}$ parallel to a line segment included in the route data, the unit vector $e_j^{(vert)}$ vertical to the $e_j^{(para)}$, and the route-direction length $\lambda_j$ from the route-direction origin to $s_j$ are calculated as follows.

$$e_j^{(para)} = \frac{1}{|s_{j+1} - s_j|}(s_{j+1} - s_j) \qquad (18)$$

$$e_j^{(vert)} = \begin{bmatrix} 0 & 1 \\ -1 & 0 \end{bmatrix} e_j^{(para)} \qquad (19)$$

$$\lambda_j = \sum_{i=1}^{j-1} |s_{i+1} - s_i| \qquad (20)$$

It is defined that the absolute-value sign (||) for a vector is the Euclidean distance of the vector. It is defined that the foregoing serial numbers j in the route data are the numbers of center points between which the subject vehicle 21 is sandwiched back and forth and that the serial number j is the same as or larger than 1 but the same as or smaller than I and satisfies the following condition.

$$\lambda_j < xx_{k|k-1}^{(para,1)} < \lambda_{j+1} \tag{21}$$

In the step ST4, the sensor unit 14 obtains observation data and the filtering unit 15 relates the observation data to the subject vehicle 21. In general, when regardless of the kind of a sensor, the position of the subject vehicle 21 is observed by a sensor, there may occur a situation where in addition to the observation data indicating the position of the subject vehicle 21, erroneous observation data derived from an object other than the subject vehicle 21 is obtained. For example, when the sensor unit 14 is a vehicle observation sensor such as a camera based on a visible-light image, the position of an object such as a billboard resembling a vehicle may become the erroneous observation data. For example, when the sensor unit 14 is a vehicle observation sensor such as a radar based on the reflection intensity of an electromagnetic wave, the position of an electronic-wave reflector such as a guardrail may become the erroneous observation data.

In general, when regardless of the kind of a sensor, the position of the subject vehicle 21 is observed by a sensor, there may occur a situation where the observation data does not include observation data derived from the subject vehicle 21. For example, in the case where the sensor unit 14 is a camera and an obstacle covers the subject vehicle 21 to be viewed by the camera, no observation data derived from the subject vehicle 21 is obtained. For example, in the case where the sensor unit 14 is a radar and an electric wave reflected by the subject vehicle 21 is buried in a noise signal, no observation data derived from the subject vehicle 21 is obtained.

For the foregoing reasons, in the step ST4, the observation data obtained at the present time and the motion-dimension prediction value are compared with each other, so that it is determined whether or not observation data derived from the subject vehicle 21 exists; in the case where observation data derived from the subject vehicle 21 exists, there is performed relating with regard to which observation data it is. In the relating, for each of the observation data pieces $z_k$, the following Mahalanobis distance δ indicating the residual between the observation data and the prediction position is calculated.

$$\delta = (z_k - Hx_{k|k-1}^{(obs)})^T S_k^{-1}(z_k - Hx_{k|k-1}^{(obs)}) \tag{22}$$

where, $S_k$ is an error covariance matrix related to the residual between the prediction position of the subject vehicle 21 and the observation data; $s_k$ is calculated by the equation below.

$$S_k = HP_{k|k-1}^{(obs)} H^T + R \tag{23}$$

where R is the error covariance matrix for the observation data $z_k$ and is a parameter to be set preliminarily. "H" is a matrix for extracting a position vector from the observation-coordinate motion dimension and is defined by the equation below.

$$H = \begin{bmatrix} 1 & 0 & 0 & 0 \\ 0 & 1 & 0 & 0 \end{bmatrix} \tag{24}$$

It is suggested that as the residual δ calculated by the equation (22) is smaller, the observation data more matches the prediction value for the subject vehicle 21; thus, observation data, among two or more observation data pieces, that makes the residual δ minimum is regarded as being derived from the subject vehicle 21 and is related to the subject vehicle 21; then, this observation data is regarded as the observation data $z_k$ to be processed in the step ST5. In addition, as described above, there may occur the case where no observation data derived from the subject vehicle 21 is obtained; therefore, in the case where no observation data that makes the residual δ smaller than a specific value exists or in the case where no observation data is obtained at the present time, an ineffective value is substituted for the observation data to be processed in the step ST5.

In the step ST5, based on observation data, the filtering unit 15 calculates the motion-dimension estimation value of the subject vehicle 21 and the estimation error at the present time. The observation data $z_k$ to be utilized here is the observation data that has been related to the subject vehicle 21 in the step ST4.

The motion-dimension estimation value $x_k^{(obs)}$ for the subject vehicle 21 at the present time and the error covariance matrix $P_k^{(obs)}$ of the motion-dimension estimation value are calculated by the equations below.

$$x_k^{(obs)} = x_{k|k-1}^{(obs)} + K_k(z_k - Hx_{k|k-1}^{(obs)}) \tag{25}$$

$$P_k^{(obs)} = P_{k|k-1}^{(obs)} - K_k HP_{k|k-1}^{(obs)} \tag{26}$$

where H is the same as that in the equation (24). $K_k$ is defined as follows.

$$K_k = P_{k|k-1}^{(obs)} H^T S_k^{-1} \tag{27}$$

where $S_k$ is the same as that in the equation (23), and the superscript "−1" denotes an inverse matrix. When the observation data $z_k$ is an ineffective value, it is regarded that the subject vehicle 21 has not observed at the present time; then, the prediction value are adopted as the estimation value as follows.

$$x_k^{(obs)} = x_{k|k-1}^{(obs)} \tag{28}$$

$$P_k^{(obs)} = P_{k|k-1}^{(obs)} \tag{29}$$

In the step ST6, the second coordinate transformation unit 16 transforms the observation-coordinate motion dimension estimation value into the route-coordinate motion dimension estimation value. In addition, the second coordinate transformation unit 16 transforms the observation-coordinate motion dimension estimation error into the route-coordinate motion dimension estimation value. In the transformation, the route data $s_i$ from the route data storage unit 12 is utilized. In this step, by use of $x_k^{(obs)}$, $P_k^{(obs)}$, and $s_i$, as the inputs, the route-coordinate motion dimension estimation values $x_k^{(para)}$ and $x_k^{(vert)}$ and the route-coordinate motion dimension estimation errors $P_k^{(para)}$ and $P_k^{(vert)}$ are calculated by the equations below.

$$x_k^{(para)} = (G_j^{(para)})^T \{x_k^{(obs)} - g_j\} \tag{30}$$

$$x_k^{(vert)} = (G_j^{(vert)})^T \{x_k^{(obs)} - g_j\} \tag{31}$$

$$P_k^{(para)} = (G_j^{(para)})^T P_k^{(obs)} G_j^{(para)} \tag{32}$$

$$P_k^{(vert)} = (G_j^{(vert)})^T P_k^{(vert)} G_j^{(vert)} \tag{33}$$

where rotation matrixes $G_j^{(para)}$ and $G_j^{(vert)}$ are defined to be the same as those in the equations (15) and (16), respectively, in the step ST3; the translation vector $g_j$ is defined to be the same as that in the equation (17) in the step ST3.

However, it is defined that the foregoing serial numbers j in the route data are the numbers of center points between which the subject vehicle 21 is sandwiched back and forth at the route-parallel direction position and that the serial number j is the same as or larger than 1 but the same as or smaller than I and satisfies the following condition.

$$s_j^{(2)} < x_k^{(obs,2)} < s_{j+1}^{(2)} \tag{34}$$

$\lambda_j$ is defined to be the same as that in the equation (20) in the step ST3.

In the step ST7, based on the route-coordinate motion dimension estimation value and the estimation error, the state determination unit 17 determines whether or not the subject vehicle 21 is meandering, as the motion state of the subject vehicle 21. In the determination, the Mahalanobis distance Ok below is calculated.

$$\Delta_k = (hx_k^{(vert)})^T (hP_k^{(vert)}h)^{-1}(hx_k^{(vert)}) \tag{35}$$

where "h" is a matrix for extracting a position component from the route-vertical direction motion dimension and is defined by the equation below.

$$h = [1\ 0] \tag{36}$$

It is suggested that as $\Delta_k$ in the equation (35) is larger, the distance from the center of the route to the estimation position of the subject vehicle 21 is significantly larger than the estimation error in the position. Accordingly, when the time-series graph of $\Delta_k$ oscillates with an amplitude the same as or larger than a specific value, it is determined that the subject vehicle 21 is meandering. In a determination on the amplitude of $\Delta_k$, for example, there is utilized a method in which the difference between the maximal value and the minimal value of $\Delta_k$ in a specific time frame is adopted as the amplitude or a method in which a short-time Fourier transformation is applied to $\Delta_k$ and then the peak value in the frequency components is adopted as the amplitude.

In the above explanation, it is determined whether or not a meandering exists based only on the route-vertical direction motion dimension and the estimation error thereof; however, it may be allowed that the route-parallel direction motion dimension and the estimation error thereof are utilized. For example, the amplitude threshold value of $\Delta_k$ for making a determination on a meandering may continuously be raised in accordance with how much the route-parallel direction position is larger than the estimation error thereof, i.e., how much the subject vehicle 21 and the sensor are away from each other.

The motion state determination apparatus 100, configured in such a manner as described above, according to Embodiment 1 makes it possible to obtain the following effect. At first, in the motion state determination apparatus 100 according to Embodiment 1, errors in the motion-dimension estimation value are sequentially calculated and then the motion state of the subject vehicle 21 is determined based on the errors. The error in the observation data, anticipated in the filtering unit 15, is reflected in the error, in the motion-dimension estimation value, that is utilized in the determination. In other words, the state determination unit 17 determines the motion state of the subject vehicle 21, based on the error in the observation data, calculated by use of a motion-dimension prediction value. This configuration makes it possible to distinguish a motion-dimension change caused by the error in the observation data from the true motion-dimension change. In comparison with the conventional technology disclosed in Patent Document 1 in which the motion state is determined based only on the position of the subject vehicle 21, this effect is conspicuously demonstrated in that in the case where the subject vehicle 21 is traveling away from the sensor and the error in the observation data is large, it is made possible to reduce the frequency of the situation where the position change, of the subject vehicle 21 on the observation data, that is caused by an observation error is erroneously determined as a meandering of the subject vehicle 21.

Moreover, in the motion state determination apparatus 100 according to Embodiment 1, the motion-dimension estimation value of the subject vehicle 21 and the motion-dimension estimation error are calculated with regard to each of the route-vertical direction component and the route-parallel direction component; then, based on these route-coordinate motion-dimension estimation values and estimation error values, the motion state of the subject vehicle 21 is determined. This configuration makes it possible to perform a state determination based on time-series data related to the route-vertical motion-dimension estimation value and the estimation error therein and to the route-parallel motion-dimension estimation value and the estimation error therein, even when the route on which the subject vehicle 21 travels is bent in an arbitrary shape. In the case where the route itself on which the subject vehicle 21 travels is meandering, this effect is conspicuously demonstrated in that a simple means in which it is determined whether or not the subject vehicle 21 is meandering, based on the motion-dimension estimation value and the estimation error, for example, on the direction-based coordinate system cannot distinguish a meandering along the route from a meandering in a direction deviated from the route, but the motion state determination apparatus 100 according to Embodiment 1 can distinguish these meanderings.

Moreover, in the motion state determination apparatus 100 according to Embodiment 1, each of the route-parallel motion dimension and the route-vertical motion dimension is predicted. In general, in comparison with the frequency of route-parallel acceleration or deceleration of an automobile or a two-wheeled vehicle, the frequency of route-vertical acceleration or deceleration thereof is small. Accordingly, for the route-parallel direction and the route-vertical direction, different motion models and different motion-model errors are set, so that it is made possible to predict the motion dimension more corresponding to the real motion of the subject vehicle 21. This effect is conspicuously demonstrated in that in comparison with a simple means in which the motion dimension is predicted, for example, on the direction-based coordinate system, it is made possible that the motion-dimension prediction error is reduced and hence the estimation error is decreased and it is made possible that a determination on a minute change in the motion dimension is performed based on comparison with an estimation error, so that the frequency of an error in the motion-state determination can be decreased.

As described above, the motion state determination apparatus 100 according to Embodiment 1 is characterized by including the sensor unit 14 for obtaining observation data on a target object (for example, the subject vehicle 21), the route data storage unit 12 for storing route data indicating the shape of a route on which the target object can move, the route component prediction unit 1 that calculates the component parallel to the route and the component vertical to the route of each of the motion-dimension prediction value for the target object and the prediction error, the first coordinate transformation unit 13 that transforms the motion-dimension prediction value and the prediction error calculated by the route component prediction unit 1 into those on a coordinate system the same as a first coordinate system for representing the observation data, the filtering unit 15 that calculates the motion-dimension estimation value for the target object and the estimation error, by use of the observation data obtained by the sensor unit 14, the route data stored in the route data storage unit 12, and the motion-dimension prediction value and the prediction error transformed by the first coordinate transformation unit 13, the second coordinate transformation unit 16 that transforms the motion-dimension estimation value for the target object and the estimation error calculated by the filtering unit 15 into those on a second coordinate system whose coordinate axes are the component parallel to the route and the component vertical to the route, and the state determination unit 17 that determines the motion state of the target object, by use of the motion-dimension estimation value for the target object and the estimation error transformed by the second coordinate transformation unit 16.

The motion state determination apparatus according to the present disclosure makes it possible to reduce the frequency of erroneous determination on the motion state of a target object, due to a positional change, of the target object on the observation data, that is caused by an observation error. In particular, even when an error exits in the observation data, the motion state determination apparatus according to the present disclosure can decrease the motion-dimension estimation error for a target object by predicting the motion dimension of the target object. As a result, in comparison with a conventional technology utilizing only observation data, the frequency of erroneous determination on the motion state of the target object can be reduced. Moreover, it is made possible to perform a state determination based on time-series data related to the route-vertical motion-dimension estimation value and the estimation error therein and the route-parallel motion-dimension estimation value and the estimation error therein, even when the route on which the target object travels is bent in an arbitrary shape; thus, the frequency of erroneous determination on the motion state of the target object can be reduced.

The motion state determination apparatus 100 according to Embodiment 1 is characterized in that the route component prediction unit 1 sets respective different motion models in the direction parallel to the route and in the direction vertical to the route and calculates the component parallel to the route and the component vertical to the route. Use of this configuration makes it possible to predict the motion dimension more corresponding to the actual motion of the subject vehicle 21.

Embodiment 2

In Embodiment 1, based on a motion model, the motion dimension in the route-parallel direction is predicted, and based on another motion model, the motion dimension in the route-vertical direction is predicted. However, because the subject vehicle 21 perform diverse motions, it is not always made possible that each of the route-parallel motion and the route-vertical motion is adequately represented by one kind of a motion model.

For example, in the case where a route is crowded with vehicles other than the subject vehicle 21, the subject vehicle 21 frequently accelerates or decelerates in the route-parallel direction in order to adjust the distance between the cars; however, in the case where the route is not crowded, the probability that the route-parallel motion of the subject vehicle 21 maintains a constant speed is high. Moreover, the route-vertical motion depends on the weight of the subject vehicle 21, the road-surface environment, and the like; for example, in the case where the subject vehicle 21 is a large vehicle, the probability that acceleration or deceleration in the route-vertical direction occurs is low, in comparison with a small vehicle. Moreover, it is not always made possible that the own vehicle 20 obtains the crowdedness situation, the vehicle weight, the road-surface environment, and the like that characterize the motion of the subject vehicle 21. Thus, when in the case where the attribution of the subject vehicle 21 and the road-surface environment are diverse and the conditions thereof cannot be obtained, one kind of a motion model for each of the route-parallel motion dimension and the route-vertical motion dimension is presumed and predicted, the prediction error becomes large and erroneous determination on the motion state, caused by an estimation error, frequently occurs eventually.

Accordingly, in Embodiment 2, for each of the route-parallel motion dimension and the route-vertical motion dimension, two or more prediction values having different motion models are calculated. Moreover, respective motion-dimension estimation values are calculated for the prediction values, and based on the adequate one among the estimation values, the motion state of the subject vehicle 21 is determined. This configuration makes it possible that even when the kinds of motion models of the subject vehicle 21 is too diverse to be represented by one kind of a motion model, the frequency of erroneous determination on the motion state can be decreased.

Figure 8:
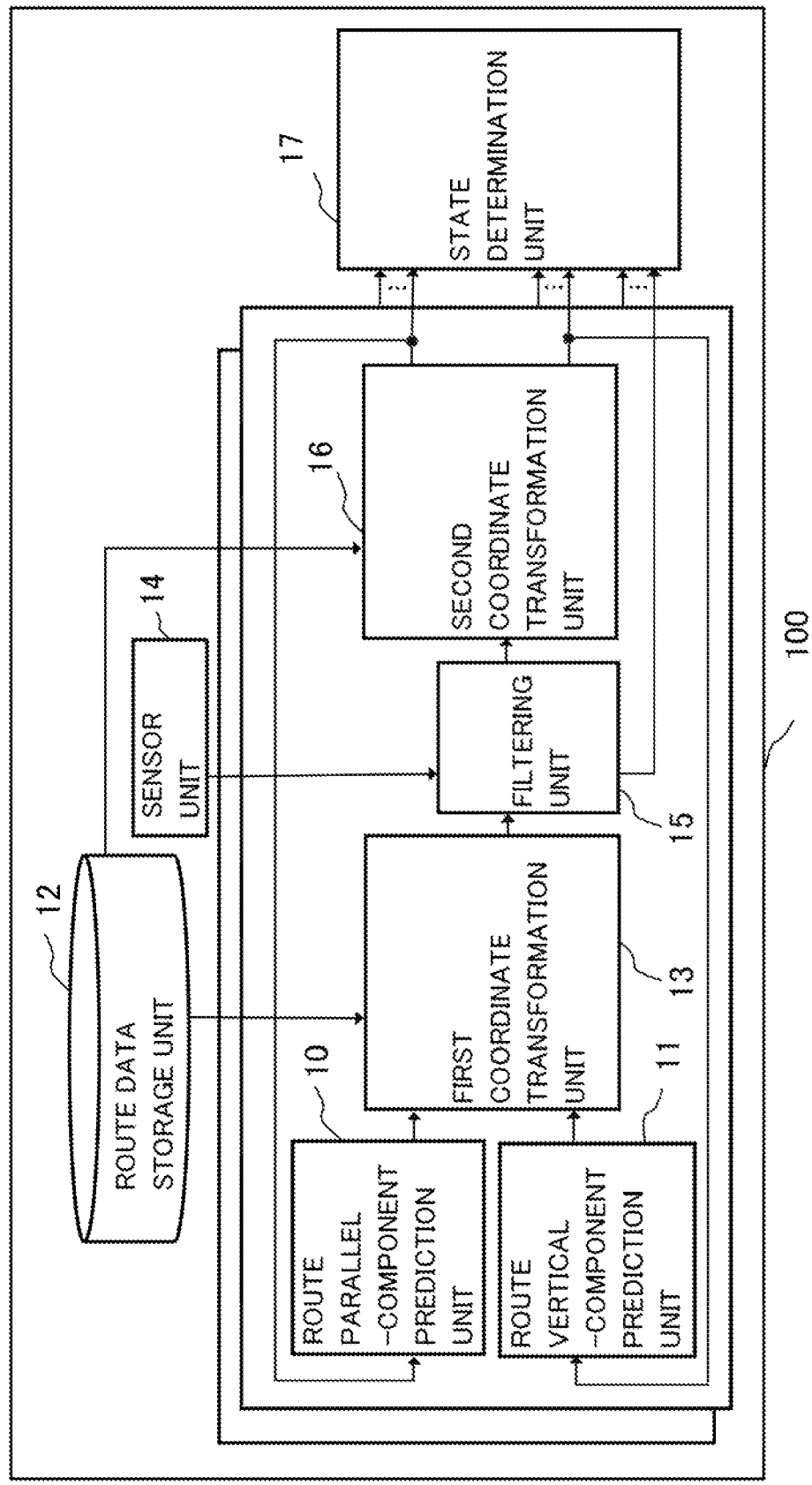
FIG. 8 is a block diagram representing the configuration of a motion state determination apparatus 100 according to Embodiment 2.

FIG. 8 is a block diagram representing the configuration of a motion state determination apparatus 100 according to Embodiment 2. As represented in FIG. 8, the motion state determination apparatus 100 according to Embodiment 2 includes the route parallel-component prediction unit 10, the route vertical-component prediction unit 11, the route data storage unit 12, the first coordinate transformation unit 13, the sensor unit 14, the filtering unit 15, the second coordinate transformation unit 16, and the state determination unit 17. However, N pieces each of the route parallel-component prediction unit 10, the route vertical-component prediction unit 11, the first coordinate transformation unit 13, the filtering unit 15, and the second coordinate transformation unit 16 are arranged in parallel with one another (N is an integer of 2 or larger). Here, each of the route data storage unit 12 and the sensor unit 14 is the same as that in Embodiment 1. Embodiment 2 is different from Embodiment 1 in that N pieces each of the first coordinate transformation unit 13 and the second coordinate transformation unit 16 are arranged in parallel with one another; however, the internal processing of each of the first coordinate transformation unit 13 and the second coordinate transformation unit 16 is the same as that in Embodiment 1.

Hereinafter, the relationships among functional blocks in FIG. 8 will be described as follows. With regard to N pieces each of the route parallel-component prediction unit 10, the route vertical-component prediction unit 11, the first coordinate transformation unit 13, the filtering unit 15, and the second coordinate transformation unit 16, the respective n-th functional blocks thereof will be explained (n is an integer the same as or larger than 1 but the same as or smaller than N).

The n-th route parallel-component prediction unit 10 receives an n-th route parallel-component estimation value of the motion dimension of the subject vehicle 21 and an n-th route parallel-component estimation error at the previous time from the n-th second coordinate transformation unit 16, and then transmits an n-th route parallel-component prediction value of the motion dimension of the subject vehicle 21 and an n-th route parallel-component prediction error at the present time to the n-th first coordinate transformation unit 13.

The n-th route vertical-component prediction unit 11 receives an n-th route vertical-component estimation value of the motion dimension of the subject vehicle 21 and an n-th route vertical-component estimation error at the previous time from the n-th second coordinate transformation unit 16, and then transmits an n-th route vertical-component prediction value of the motion dimension of the subject vehicle 21 and an n-th route vertical-component prediction error at the present time to the n-th first coordinate transformation unit 13.

The n-th first coordinate transformation unit 13 receives the n-th route parallel-component prediction value of the motion dimension of the subject vehicle 21 and the n-th route parallel-component prediction error at the present time from the n-th route parallel-component prediction unit 10, receives the n-th route vertical-component prediction value of the motion dimension of the subject vehicle 21 and the n-th route vertical-component prediction error at the present time from the n-th route vertical-component prediction unit 11, and receives the route data from the route data storage unit 12. Then, the n-th first coordinate transformation unit 13 transmits an n-th observation-coordinate motion dimension prediction value for the subject vehicle 21 and an n-th observation-coordinate motion dimension prediction error at the present time to the n-th filtering unit 15.

The n-th filtering unit 15 receives the n-th observation-coordinate motion dimension prediction value and the n-th observation-coordinate motion dimension prediction error at the present time frame from the n-th first coordinate transformation unit 13 and receives the observation data on the subject vehicle 21 at the present time from the sensor unit 14. Then, the n-th filtering unit 15 transmits an n-th observation-coordinate motion dimension estimation value for the subject vehicle 21 and an n-th observation-coordinate motion dimension estimation error at the present time to the n-th second coordinate transformation unit 16. Moreover, the n-th filtering unit 15 transmits the residual between the n-th prediction position for the subject vehicle 21 and the observation data at the present time to the state determination unit 17.

The n-th second coordinate transformation unit 16 receives the n-th observation-coordinate motion dimension estimation value for the subject vehicle 21 and the n-th observation-coordinate motion dimension estimation error at the present time from the n-th filtering unit 15 and receives the observation data from the route data storage unit 12. Then, the n-th second coordinate transformation unit 16 transmits the n-th route-coordinate motion dimension estimation value for the subject vehicle 21 and the n-th route-coordinate motion dimension estimation error at the present time to the state determination unit 17. Moreover, in the next time frame, the n-th second coordinate transformation unit 16 transmits the n-th route parallel-component estimation value of the motion dimension of the subject vehicle 21 and the n-th route parallel-component estimation error at the previous time to the n-th route parallel-component prediction unit 10 and transmits the n-th route vertical-component estimation value of the motion dimension of the subject vehicle 21 and the n-th route vertical-component estimation error at the previous time to the n-th route vertical-component prediction unit 11.

The state determination unit 17 receives the first to N-th route-coordinate motion dimension estimation value for the subject vehicle 21 and the first to N-th route-coordinate motion dimension estimation error at the present time from the first to N-th second coordinate transformation unit 16 and receives the residual between the first to N-th prediction position of the subject vehicle 21 and the observation data piece at the present time from the first to N-th filtering unit 15. Then, the state determination unit 17 outputs, as the output of the motion state determination apparatus 100, whether or not a meandering of the subject vehicle 21 exists at the present time.

FIG. 4 represents the hardware configuration according to Embodiment 2, which is the same as that according to Embodiment 1. In the motion state determination apparatus 100 according to Embodiment 2, the first to N-th route parallel-component prediction units 10, the first to N-th route vertical-component prediction units 11, the first to N-th first coordinate transformation units 13, the first to N-th filtering units 15, the first to N-th second coordinate transformation units 16, and the state determination unit 17 are stored in the storage apparatus 42; the respective functions of the first to N-th route parallel-component prediction units 10, the first to N-th route vertical-component prediction units 11, the first to N-th first coordinate transformation units 13, the first to N-th filtering units 15, the first to N-th second coordinate transformation units 16, and the state determination unit 17 are performed by the calculation apparatus 41. The route data storage unit 12 is contained in the storage apparatus 42.

The first to N-th route parallel-component prediction units 10, the first to N-th route vertical-component prediction units 11, the first to N-th first coordinate transformation units 13, the first to N-th filtering units 15, the first to N-th second coordinate transformation units 16, and the state determination unit 17 in operation each write input/output values and processing intermediate data in the storage apparatus 42 and each perform reading and deleting thereof from the storage apparatus 42.

Figure 9:
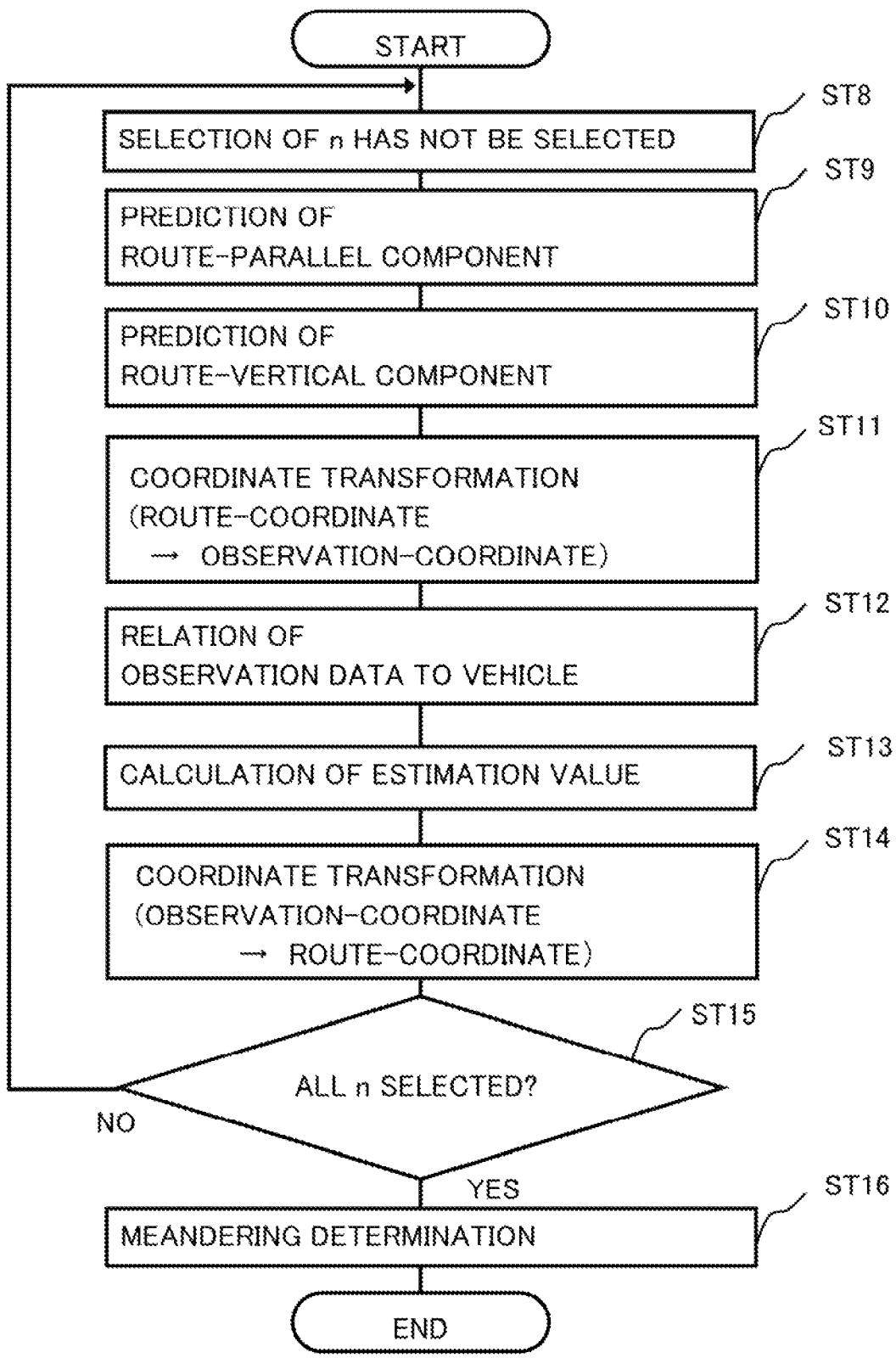
FIG. 9 is a flowchart representing the operation of the motion state determination apparatus 100 according to Embodiment 2.

Next, the details of the operation of the motion state determination apparatus 100 according to Embodiment 2 will be explained by use of a flowchart in FIG. 9. FIG. 9 a flowchart representing the respective operation items of the first to N-th route parallel-component prediction units 10, the first to N-th route vertical-component prediction units 11, the first to N-th first coordinate transformation units 13, the first to N-th sensors 14, the first to N-th filtering units 15, the first to N-th second coordinate transformation units 16, and the state determination unit 17 at the present time. Among the symbols, the subscripts, and the superscripts in the following explanations, the ones without any explanation signify the same meanings as those in Embodiment 1.

As preparation for the explanation of the operation, there will be defined symbols related to the n-th motion dimensions, of the subject vehicle 21, that is calculated by the n-th route parallel-component prediction unit 10, the n-th route vertical-component prediction unit 11, the n-th first coordinate transformation unit 13, the n-th filtering unit 15, and the n-th second coordinate transformation unit 16 (n is an integer the same as or larger than 1 but the same as or smaller than N).

At first, the n-th motion-dimension estimation value for the subject vehicle 21 on the observation coordinates in the time frame k is represented by the vector $x_{k,n}^{(obs)}$ below.

$$x_{k,n}^{(obs)} = [x_{k,n}^{(obs,1)} x_{k,n}^{(obs,2)} x_{k,n}^{(obs,3)} x_{k,n}^{(obs,4)}]^T \quad (37)$$

where, $x_{k,n}^{(obs,1)}$ indicates the transverse-position estimation value of the subject vehicle 21; $x_{k,n}^{(obs,2)}$ indicates the longitudinal-position estimation value of the subject vehicle 21; $x_{k,n}^{(obs,3)}$ indicates the transverse-speed estimation value of the subject vehicle 21; $x_{k,n}^{(obs,4)}$ indicates the longitudinal-speed estimation value of the subject vehicle 21.

The n-th motion-dimension estimation values for the subject vehicle 21 on the route coordinates in the time frame k are represented by a 2-row 1-column vector $x_{k,n}^{(para)}$ below indicating the route-parallel component motion dimension estimation value and a 2-row 1-column vector $x_{k,n}^{(vert)}$ below indicating the route-vertical component motion dimension estimation value. Each of the vectors $x_{k,n}^{(para)}$ and $x_{k,n}^{(vert)}$ is defined as follows.

$$x_{k,n}^{(para)} = [x_{k,n}^{(para,1)} x_{k,n}^{(para,2)}]^T \quad (38)$$

$$x_{k,n}^{(vert)} = [x_{k,n}^{(vert,1)} x_{k,n}^{(vert,2)}]^T \quad (39)$$

where, $x_{k,n}^{(para,1)}$ indicates the estimation value of the route-parallel direction position of the subject vehicle 21; $x_{k,n}^{(para,2)}$ indicates the estimation value of the route-parallel direction speed of the subject vehicle 21; $x_{k,n}^{(vert,1)}$ indicates the estimation value of the route-vertical direction position of the subject vehicle 21; $x_{k,n}^{(vert,2)}$ indicates the estimation value of the route-vertical direction speed of the subject vehicle 21.

Next, the motion-dimension estimation error of each of the motion dimensions will also be defined. The error in the motion-dimension estimation value vector $x_{k,n}^{(obs)}$ on the observation coordinates is represented as $P_{k,n}^{(obs)}$. The errors in the motion-dimension estimation value vectors $x_{k,n}^{(para)}$ and $x_{k,n}^{(vert)}$ on the route coordinates are represented as $P_{k,n}^{(para)}$ and $P_{k,n}^{(vert)}$, respectively.

Hereinafter, the respective steps in FIG. 9 will be explained. In the step ST8, the motion state determination apparatus 100 selects an integer number that is the same as or larger than 1 but the same as or smaller than N and has not been selected in the processing at the present time. It is decided in an arbitrary manner which number among unselected numbers is to be selected. In the explanations in the following steps ST9 through ST13, there will be explained the processing at a time when the number "n" has been selected.

In the step ST9, the n-th route parallel-component prediction unit 10 predicts the n-th route-parallel component motion dimension at the present time and then calculates an error in the motion-dimension prediction value.

In this step, by use of the n-th motion-dimension estimation value $x_{k,n}^{(para)}$ and the n-th estimation error $P_{k,n}^{(para)}$ at the previous time, as the inputs, and based on a n-th motion model in which the route-parallel position of the subject vehicle 21 moves at a constant speed, the n-th motion-dimension prediction value $x_{k|k-1,n}^{(para)}$ and the n-th prediction error $P_{k|k-1,n}^{(para)}$ are calculated by the equations below.

$$x_{k|k-1,n}^{(para)} = \Phi_{k,n}^{(para)} x_{k-1,n}^{(para)} \quad (40)$$

$$P_{k|k-1,n}^{(para)} = \Phi_{k,n}^{(para)} P_{k-1,n}^{(para)} [\Phi_{k,n}^{(para)}]^T + Q_{k,n}^{(para)} \quad (41)$$

$Q_{k,n}^{(para)}$ is a 2-row 2-column error covariance matrix indicating an error in the n-th route-parallel direction motion model and is a parameter to be preliminarily set. $\Phi_{k,n}^{(para)}$ is a transition matrix for making a motion dimension vector transit from the previous time to the present time based on the n-th route-parallel direction motion model and is represented, for example, by the equation below.

$$\Phi_{k,n}^{(para)} = \begin{bmatrix} 1 & \tau_k \\ 0 & 1 \end{bmatrix} \quad (42)$$

In the foregoing equations, it has been assumed that the n-th route-parallel component motion model is constant-speed movement; however, it may be allowed that another motion model is adopted. For example, it may be allowed that it is assumed that the motion model is uniformly accelerated motion and the equation (40) is replaced by the equation (43) below.

$$x_{k|k-1,n}^{(para)} = \Phi_{k,n}^{(para)} x_{k-1,n}^{(para)} + \begin{bmatrix} \frac{1}{2} a_n^{(para)} (\tau_k)^2 \\ a_n^{(para)} \tau_k \end{bmatrix} \quad (43)$$

where $a_n^{(para)}$ is a parameter indicating route-parallel component acceleration.

In the step ST10, the n-th route vertical-component prediction unit 11 predicts the n-th route-vertical component motion dimension at the present time and then calculates an error in the motion-dimension prediction value. In this step, by use of the n-th motion-dimension estimation value $x_{k,n}^{(vert)}$ and the n-th estimation error $P_{k,n}^{(vert)}$ at the previous time, as the inputs, and based on a n-th motion model in which the route-vertical position of the subject vehicle 21 moves at a constant speed, the n-th motion-dimension prediction value $x_{k|k-1,n}^{(vert)}$ and the n-th prediction error $P_{k|k-1,n}^{(vert)}$ are calculated by the equations below.

$$x_{k|k-1,n}^{(vert)} = \Phi_{k,n}^{(vert)} x_{k-1,n}^{(vert)} \quad (44)$$

$$P_{k|k-1,n}^{(vert)} = \Phi_{k,n}^{(vert)} P_{k-1,n}^{(vert)} [\Phi_{k,n}^{(vert)}]^T + Q_{k,n}^{(vert)} \quad (45)$$

where, $Q_{k,n}^{(vert)}$ is a 2-row 2-column error covariance matrix indicating an error in the n-th route-vertical direction motion model and is a parameter to be preliminarily set. $\Phi_{k,n}^{(vert)}$ is a transition matrix for making a motion dimension vector transit from the previous time to the present time based on the n-th route-vertical direction motion model and is represented, for example, by the equation below.

$$\Phi_k^{(vert)} = \begin{bmatrix} 1 & \tau_k \\ 0 & 1 \end{bmatrix} \quad (46)$$

In the foregoing equations, it has been assumed that the n-th route-parallel component motion model is constant-speed movement; however, it may be allowed that another motion model is adopted. For example, it may be allowed that it is assumed that the motion model is uniformly accelerated motion and the equation (44) is replaced by the equation (43) below.

$$x_{k|k-1,n}^{(vert)} = \Phi_{k,n}^{(vert)} x_{k-1,n}^{(vert)} + \begin{bmatrix} \frac{1}{2} a_n^{(vert)} (\tau_k)^2 \\ a_n^{(vert)} \tau_k \end{bmatrix} \quad (47)$$

where $a_n^{(vert)}$ is a parameter indicating route-vertical component acceleration. The motion model and the parameter assumed in the step ST9 may be different from the motion model and the parameter assumed in the step ST10.

In the step ST11, the n-th first coordinate transformation unit 13 transforms the n-th route-coordinate motion dimension prediction value into the n-th observation-coordinate motion dimension prediction value. In addition, the n-th first coordinate transformation unit 13 transforms the n-th route-coordinate motion dimension prediction error into the n-th observation-coordinate motion dimension prediction error. In the transformation, the route data $s_i$ from the route data storage unit 12 is utilized. In this step, by use of $x_{k|k-1,n}^{(para)}$, $P_{k|k-1,n}^{(para)}$, $x_{k|k-1,n}^{(vert)}$, $P_{k|k-1,n}^{(vert)}$, and $s_i$, as the inputs, the observation-coordinate motion dimension prediction value $x_{k|k-1,n}^{(obs)}$ and the observation-coordinate motion dimension prediction error $P_{k|k-1,n}^{(obs)}$ are calculated by the equations below.

$$x_{k|k-1,n}^{(obs)} = G_j^{(para)} x_{k|k-1,n}^{(para)} + G_j^{(vert)} x_{k|k-1,n}^{(vert)} + g_j \quad (48)$$

$$P_{k|k-1,n}^{(obs)} = G_j^{(para)} P_{k|k-1,n}^{(para)} (G_j^{(para)})^T + G_j^{(vert)} P_{k|k-1,n}^{(vert)} (G_j^{(vert)})^T \quad (49)$$

where, the rotation matrixes $G_j^{(para)}$ and $G_j^{(vert)}$ and the translation vector $g_j$ are defined in the same manner as in the step ST3 according to Embodiment 1. It is defined that the foregoing serial numbers j in the route data are the numbers of center points between which the subject vehicle 21 is sandwiched back and forth and that the serial number j is the same as or larger than 1 but the same as or smaller than I and satisfies the following condition.

$$\lambda_k < x_{k|k-1,n}^{(para,1)} < \lambda_{j+1} \quad (50)$$

$\lambda_j$ is defined to be the same as that in the equation (20) in the step ST3.

In the step ST12, the sensor unit 14 obtains observation data and the filtering unit 15 relates the observation data to the subject vehicle 21. In the relating, for each of the observation data pieces $z_k$, the following Mahalanobis distance $\delta_n$ indicating the residual between the observation data and the prediction position is calculated.

$$\delta_n = (z_k - Hx_{k|k-1,n}^{(obs)})^T S_{k,n}^{-1} (z_k - Hx_{k|k-1,n}^{(obs)}) \quad (51)$$

where, $S_{k,n}$ is an error covariance matrix related to the residual between the n-th prediction position of the subject vehicle 21 and the observation data; $S_{k,n}$ is calculated by the equation below.

$$S_{k,n} = H P_{k|k-1,n}^{(obs)} H^T + R \quad (52)$$

The observation data, among two or more observation data pieces $z_k$, that makes the residual $\delta_n$ minimum is regarded as being derived from the subject vehicle 21 and is related to the subject vehicle 21; then, this observation data is regarded as the observation data $z_k$ to be processed in the step ST13. In addition, in the case where no observation data that makes the residual $\delta_n$ smaller than a specific value exists or in the case where no observation data is obtained at the present time, an ineffective value is substituted for the observation data to be processed in the step ST13. In addition, in Embodiment 2, the residual $\delta_n$ calculated here is utilized also in a motion-state determination in the step ST16.

In the step ST13, based on observation data, the n-th filtering unit 15 calculates the n-th motion-dimension estimation value and the n-th estimation error at the present time. The observation data $z_k$ to be utilized here is the observation data that has been related to the subject vehicle 21 in the step ST4. The n-th motion-dimension estimation value $x_{k,n}^{(obs)}$ for the subject vehicle 21 at the present time and the n-th error covariance matrix $P_{k,n}^{(obs)}$ of the motion-dimension estimation value are calculated by the equations below.

$$x_{k,n}^{(obs)} = x_{k|k-1,n}^{(obs)} + K_{k,n}(z_k - Hx_{k|k-1,n}^{(obs)}) \quad (53)$$

$$P_{k,n}^{(obs)} = P_{k|k-1,n}^{(obs)} - K_{k,n} H P_{k|k-1,n}^{(obs)} \quad (54)$$

where $K_{k,n}$ is defined as follows.

$$K_{k,n} = P_{k|k-1,n}^{(obs)} H^T S_{k,n}^{-1} \quad (55)$$

where $S_{k,n}$ is the same as that in the equation (52).

When the observation data $z_k$ is an ineffective value, it is regarded that the subject vehicle 21 has not observed at the present time; then, the prediction value are adopted as the estimation value as follows.

$$x_{k,n}^{(obs)} = x_{k|k-1,n}^{(obs)} \quad (56)$$

$$P_{k,n}^{(obs)} = P_{k|k-1,n}^{(obs)} \quad (57)$$

In the step ST14, the n-th second coordinate transformation unit 16 transforms the n-th observation-coordinate motion dimension estimation value into the n-th route-coordinate motion dimension estimation value. In addition, the n-th second coordinate transformation unit 16 transforms the n-th observation-coordinate motion dimension estimation error into the n-th route-coordinate motion dimension estimation value. In the transformation, the route data $s_i$ from the route data storage unit 12 is utilized.

In this step, by use of $x_{k,n}^{(obs)}$, $P_{k,n}^{(obs)}$, and $s_i$, as the inputs, the route-coordinate motion dimension estimation values $x_{k,n}^{(para)}$ and $x_{k,n}^{(vert)}$ and the route-coordinate motion dimension estimation errors $P_{k,n}^{(para)}$ and $P_{k,n}^{(vert)}$ are calculated by the equations below.

$$x_{k,n}^{(para)} = (G_j^{(para)})^T \{x_{k,n}^{(obs)} - g_j\} \quad (58)$$

$$x_{k,n}^{(vert)} = (G_j^{(vert)})^T \{x_{k,n}^{(obs)} - g_j\} \quad (59)$$

$$P_{k,n}^{(para)} = (G_j^{(para)})^T P_{k,n}^{(obs)} G_j^{(para)} \quad (60)$$

$$P_{k,n}^{(vert)} = (G_j^{(vert)})^T P_{k,n}^{(vert)} G_j^{(vert)} \quad (61)$$

where, the rotation matrixes $G_j^{(para)}$ and $G_j^{(vert)}$ and the translation vector $g_j$ are defined in the same manner as in the step ST6 according to Embodiment 1. In addition, it is defined that the foregoing serial numbers j in the route data are the numbers of center points between which the subject vehicle 21 is sandwiched back and forth at the route-parallel direction position and that the serial number j is the same as or larger than 1 but the same as or smaller than I and satisfies the following condition.

$$s_j^{(2)} < x_{k,n}^{(obs,2)} < s_{j+1}^{(2)} \quad (62)$$

$\lambda_j$ is defined to be the same as that in the equation (20) in the step ST3.

In the step ST15, the motion state determination apparatus 100 determines whether or not there exists an integer number that is the same as or larger than 1 but smaller than N and has not been selected in the processing at the present time. In the case where an unselected number exists, the step ST15 is followed to the step ST8; in the case where no unselected number exists, the step ST15 is followed to the step ST16.

In the step ST16, based on the N pieces each of route-coordinate motion dimension estimation value, estimation error, and residual between the prediction position and the observation data, the state determination unit 17 determines whether or not the subject vehicle 21 is meandering, as the motion state of the subject vehicle 21. At first, the following number n is obtained by use of the N pieces of residuals $\delta_n$ between the prediction positions and the observation data pieces, calculated by the equation (51).

$$n_* = \operatorname*{argmin}_{n=1,2,\ldots,N} \delta_n \tag{63}$$

As evident from the foregoing definition of $\delta_n$, it is suggested that as $\delta_n$ is smaller, the position predicted by the n-th motion model becomes closer to the observation data. Accordingly, it is made possible that the n*-th prediction value that gives the smallest $\delta_n$ is regarded as the prediction value calculated by the motion model, among N kinds of motion models, that corresponds most to the actual state of the subject vehicle 21.

After n* is calculated, the following Mahalanobis distance $\Delta_{k,*}$ is obtained.

$$\Delta_{k,*} (hx_{k,n*}^{(vert)})^T (hP_{k,n*}^{(vert)} h)^{-1} (hx_{k,n*}^{(vert)}) \tag{64}$$

It is suggested that as this $\Delta_{k,*}$ is larger, the position of the subject vehicle 21 is significantly away from the center of the route. Accordingly, when the time-series graph of $\Delta_{k,*}$ oscillates with an amplitude the same as or larger than a specific value, it is determined that the subject vehicle 21 is meandering. In a determination on the amplitude of $\Delta_{k,*}$, for example, there is utilized a method in which the difference between the maximal value and the minimal value of $\Delta_{k,*}$ in a specific time frame is adopted as the amplitude or a method in which a short-time Fourier transformation is applied to $\Delta_k$ and then the peak value in the frequency components is adopted as the amplitude.

In the above explanation, it is determined whether or not a meandering exists based only on the route-vertical direction motion dimension and the estimation error thereof; however, it may be allowed that the route-parallel direction motion dimension and the estimation error thereof are utilized. For example, the amplitude threshold value of $\Delta_{k,*}$ for making a determination on a meandering may continuously be raised in accordance with how much the route-parallel direction position is larger than the estimation error thereof, i.e., how much the subject vehicle 21 and the sensor are away from each other.

In the foregoing description, n has been calculated based on the magnitude of $\delta_n$ indicating a residual; however, n may be calculated by use of an index such as the AIC (Akaike Information Criteria) or the BIC (Bayesian Information Criteria).

The flowchart in FIG. 9 represents the operation in which the processing items in the steps ST through ST14 are sequentially performed N times; however, instead, it may be allowed that parallel processing with two or more threads is applied to the steps ST9 through ST14 and then the step ST16 is performed after the processing items in N pieces each of the route parallel-component prediction unit 10, the route vertical-component prediction unit 11, the first coordinate transformation unit 13, the filtering unit 15, and the second coordinate transformation unit 16 have been completed.

The motion state determination apparatus 100, configured in such a manner as described above, according to Embodiment 2 makes it possible to obtain the following effect. In the motion state determination apparatus 100 according to Embodiment 2, N pieces each of the route parallel-component prediction unit 10 and the route vertical-component prediction unit 11 calculate N pieces motion dimension predication values with different motion-model assumptions or different parameters in the prediction; the motion dimensions are estimated based on the respective prediction values; then, the motion states of the subject vehicle 21 are determined based on the prediction values, the prediction errors, and the residuals between the prediction value and the observation data. This configuration makes it possible that even when the subject vehicle 21 can take diverse motions, a motion dimension based on the motion model corresponding to the actual motion of the subject vehicle 21 is predicted and then the motion state is determined based on the motion dimension estimated from the prediction value. The state where N pieces of the route parallel-component prediction units 10 calculate N sets of the motion dimension prediction values and the prediction errors can be dealt with, also as the state where the route parallel-component prediction unit 10 calculates N sets of motion dimension prediction values.

In comparison with the case in which a motion state is determined through the motion dimension estimated based on one kind of motion model, this effect is conspicuously demonstrated in that in the case where the attribution of the subject vehicle 21 and the condition of the surface of a road on which the subject vehicle 21 travels are diverse and information items thereon cannot be obtained, the motion state determination can be performed by use of the motion dimension having a small prediction error and a small estimation error and hence it is made eventually possible to reduce the frequency of an erroneous motion state determination.

As described above, the motion state determination apparatus 100 according to Embodiment 2 is characterized
  in that the route component prediction unit 1 calculates the component parallel to the route and the component vertical to the route of for N sets of motion-dimension prediction values for the target object and prediction errors,
  in that the first coordinate transformation unit 13 transforms N sets of motion-dimension prediction values and prediction errors, calculated by the route component prediction unit 1, into those on the first coordinate system,
  in that the filtering unit 15 calculates the motion-dimension estimation value for the target object and the estimation error, with regard to each of N sets of motion-dimension prediction values and prediction errors, transformed by the first coordinate transformation unit 13,
  in that the second coordinate transformation unit 16 transforms N sets of motion-dimension estimation values for the target object and estimation errors, calculated by the filtering unit 15, into those on the second coordinate system, and
  in that the state determination unit 17 determines a motion state of the target object, by use of N sets of motion-dimension estimation values for the target object and estimation errors, transformed by the second coordinate transformation unit 16.

This configuration makes it possible that even when the target object can take diverse motions, a motion dimension based on the motion model corresponding to the actual motion of the target object is predicted and then the motion state is determined based on the motion dimension estimated from the prediction value.

The motion state determination apparatus 100 according to Embodiment 2 is characterized in that the route component prediction unit 1 sets respective different motion models for N sets of motion-dimension prediction values for the target object and prediction errors and calculates the component parallel to the route and the component vertical to the route. This configuration makes it possible to select the motion model, among diverse motion models, that corresponds to the actual motion of the target object; thus, eventually, it is made possible to reduce the frequency of an erroneous motion-state determination.

DESCRIPTION OF REFERENCE NUMERALS

1: route component prediction unit
10: route parallel-component prediction unit
11: route vertical-component prediction unit
12:12: route data storage unit
13: first coordinate transformation unit
14: sensor unit
15: filtering unit
16: second coordinate transformation unit
17: state determination unit
20: own vehicle
21: subject vehicle
23: observation data
41: calculation apparatus
42: storage apparatus
43: output interface
100: motion state determination apparatus

The invention claimed is:

1. A motion state determination apparatus of a vehicle comprising:
a sensor that is mounted in the vehicle and configured to obtain observation data on motion dimensions including at least a position among a position, a speed, and acceleration of a target object in a first coordinate system whose coordinate axes are an anteroposterior direction and a transverse direction of the vehicle;
a memory that stores route data indicating a shape of a route on which the target object can move; and
a processor configured to execute instructions stored in the memory to:
calculate a prediction value for the motion dimension of the target object in a route on which the target object is traveling and a prediction value for an error in the motion dimension thereof;
calculate a component parallel to the route and a component vertical to the route of each of a prediction value for the motion dimension off the target object and a prediction value for an error in the motion dimension thereof in a second coordinate system whose coordinate axes are a direction parallel to the route and a direction vertical to the route;
perform a first coordinate transformation to transform a component parallel to the route and a component vertical to the route of each of a prediction value for the motion dimension of the target object and a prediction value for an error, in the motion dimension thereof into a component in an anteroposterior direction of the vehicle and a component in a transverse direction of the vehicle in the first coordinate system;
calculate an estimation value for the motion dimension of the target object and an estimation value for an error in the motion dimension thereof in the first coordinate system, based on the observation data of the target object in the first coordinate system, a prediction value for the motion dimension of the target object, a prediction value for an error in the motion dimension thereof, and the route data stored in the memory;
perform a second coordinate transformation to transform an estimation value for the motion dimension of the target object and an estimation value for an error in the motion dimension thereof in the first coordinate system into an estimation value for the motion dimension of the subject and an estimation value for an error in the motion dimension thereof in the second coordinate system;
determine a motion state of the target object, based on a component parallel to the route and a component vertical to the route of each of an estimation value for the motion dimension of the target object and an estimation value for an error in the motion dimension thereof in the second coordinate system; and
determine whether or not the target object is meandering.

2. The motion state determination apparatus according to claim 1,
wherein the processor is further configured to:
calculate respective components parallel to the route of each of a prediction value for the motion dimension of the target object and a prediction value for an error, in the motion dimension thereof; and
calculate respective components vertical to the route of each of a prediction value for the motion dimension of the target object and a prediction value for an error in the motion dimension thereof.

3. The motion state determination apparatus according to claim 1, wherein the processor is further configured to:
set respective different motion models in the direction parallel to the route and in the direction vertical to the route; and
calculate the component parallel to the route of each of a prediction value for the motion dimension and a prediction value for an error in the motion dimension and a component vertical to the route of each of a prediction value for the motion dimension and a prediction value for an error in the motion dimension.

4. The motion state determination apparatus according to claim 1,
wherein the processor is further configured to:
calculate the component parallel to the route and the component vertical to the route of each of a prediction value for the motion dimension and a prediction value for an error in the motion dimension of each of N pieces of the target objects, wherein N is a predetermined number;
perform the first coordinate transformation in which a prediction value for each of N sets of the motion dimensions and a prediction value for an error in each of the N sets of the motion dimensions are transformed into values in the first coordinate system;
calculate an estimation value for the motion dimension of the target object and an estimation value for an error in the motion dimension thereof of each of a prediction value for each of N sets of the motion dimensions and a prediction value for an error in each of the N sets of the motion dimension, wherein said prediction values have been transformed through the first coordinate transformation;
perform the second transformation in which an estimation value for the motion dimension and an estimation value for an error in the motion dimension of each of N sets of subjects are transformed into a component parallel to the route and a component vertical to the route in the second coordinate system; and determine the motion state of the target object, by use of an estimation value for the motion dimension and an estimation value for an error in the motion dimension of each of N pieces of the target objects, wherein said estimation values have been transformed through the second coordinate transformation.

5. The motion state determination apparatus according to claim 1, wherein the processor is further configured to:

set respective different motion models for a prediction value for the motion dimension and a prediction value for an error in the motion dimension of each of N sets of the target objects; and calculate the component parallel to the route and the component vertical to the route, wherein N is a predetermined number.

6. The motion state determination apparatus according to claim 2, wherein the processor is further configured to:

set respective different motion models in the direction parallel to the route and in the direction vertical to the route; and calculate the component parallel to the route of each of a prediction value for the motion dimension and a prediction value for an error in the motion dimension and a component vertical to the route of each of a prediction value for the motion dimension and a prediction value for an error in the motion dimension.

7. The motion state determination apparatus according to claim 2, wherein the processor is further configured to:

calculate the component parallel to the route and the component vertical to the route of each of a prediction value for the motion dimension and a prediction value for an error in the motion dimension of each of N pieces of the target objects, wherein N is a predetermined number:

perform the first coordinate transformation in which a prediction value for each of N sets of the motion dimensions and a prediction value for an error in each of the N sets of the motion dimensions are transformed into values in the first coordinate system;

calculate an estimation value for the motion dimension of the target object and an estimation value for an error in the motion dimension thereof of each of a prediction value for each of N sets of the motion dimensions and a prediction value for an error in each of the N sets of the motion dimension, wherein said prediction values have been transformed through the first coordinate transformation;

perform the second transformation in which an estimation value for the motion dimension and an estimation value for an error in the motion dimension of each of N sets of subjects are transformed into a component parallel to the route and a component vertical to the route in the second coordinate system; and determine the motion state of the target object, by use of an estimation value for the motion dimension and an estimation value for an error in the motion dimension of each of N pieces of the target objects, wherein said estimation values have been transformed through the second coordinate transformation.

8. The motion state determination apparatus according to claim 3, wherein the processor is further configured to:

calculate the component parallel to the route and the component vertical to the route of each of a prediction value for the motion dimension and a prediction value for an error in the motion dimension of each of N pieces of the target objects, wherein N is a predetermined number;

perform the first coordinate transformation in which a prediction value for each of N sets of the motion dimensions and a prediction value for an error in each of the N sets of the motion dimensions are transformed into values in the first coordinate system;

calculate an estimation value for the motion dimension of the target object and an estimation value for an error in the motion dimension thereof of each of a prediction value for each of N sets of the motion dimensions and a prediction value for an error in each of the N sets of the motion dimension, wherein said prediction values have been transformed through the first coordinate transformation;

perform the second transformation in which an estimation value for the motion dimension and an estimation value for an error in the motion dimension of each of N sets of subjects are transformed into a component parallel to the route and a component vertical to the route in the second coordinate system; and determine the motion state of the target object, by use of an estimation value for the motion dimension and an estimation value for an error in the motion dimension of each of N pieces of the target objects, wherein said estimation values have been transformed through the second coordinate transformation.

9. The motion state determination apparatus according to claim 6, wherein the processor is further configured to:

calculate the component parallel to the route and the component vertical to the route of each of a prediction value for the motion dimension and a prediction value for an error in the motion dimension of each of N pieces of the target objects, wherein N is a predetermined number;

perform the first coordinate transformation in which a prediction value for each of N sets of the motion dimensions and a prediction value for an error in each of the N sets of the motion dimensions are transformed into values in the first coordinate system;

calculate an estimation value for the motion dimension of the target object and an estimation value for an error in the motion dimension thereof of each of a prediction value for each of N sets of the motion dimensions and a prediction value for an error in each of the N sets of the motion dimension, wherein said prediction values have been transformed through the first coordinate transformation;

perform the second transformation in which an estimation value for the motion dimension and an estimation value for an error in the motion dimension of each of N sets of subjects are transformed into a component parallel to the route and a component vertical to the route in the second coordinate system; and determine the motion state of the target object, by use of an estimation value for the motion dimension and an estimation value for an error in the motion dimension of each of N pieces of the target objects, wherein said estimation values have been transformed through the second coordinate transformation.

10. The motion state determination apparatus according to claim 2, wherein the processor is further configured to:
- set respective different motion models for a prediction value for the motion dimension and a prediction value for an error in the motion dimension of each of N sets of the target objects; and
- calculate the component parallel to the route and the component vertical to the route, wherein N is a predetermined number.

11. The motion state determination apparatus according to claim 1, wherein the processor further configured to:
- calculate a change in a component parallel to the route in accordance with a time change and a change in a component vertical to the route in accordance with a time change, based on a component parallel to the route and a component vertical to the route of each of an estimation value for the motion dimension of the target object and an estimation value for an error in the motion dimension thereof in the second coordinate system; and
- determine whether or not the target object is meandering, based on respective changes, in accordance with the time change, in a component vertical to the route of each of an estimation value for the motion dimension of the target object and an estimation value for an error in the motion dimension thereof.

\* \* \* \* \*